United States Patent
Kurauchi

(10) Patent No.: US 8,218,949 B2
(45) Date of Patent: Jul. 10, 2012

(54) VIDEO INFORMATION RECORDING DEVICE, VIDEO INFORMATION RECORDING METHOD, AND RECORDING MEDIUM CONTAINING THE VIDEO INFORMATION RECORDING PROGRAM

(75) Inventor: Nobukazu Kurauchi, Aichi (JP)

(73) Assignee: Panasonic Corporation, Osaka (JP)

( * ) Notice: Subject to any disclaimer, the term of this patent is extended or adjusted under 35 U.S.C. 154(b) by 1114 days.

(21) Appl. No.: 11/918,955

(22) PCT Filed: Mar. 17, 2006

(86) PCT No.: PCT/JP2006/305380
§ 371 (c)(1),
(2), (4) Date: Oct. 22, 2007

(87) PCT Pub. No.: WO2006/114954
PCT Pub. Date: Nov. 2, 2006

(65) Prior Publication Data
US 2009/0060470 A1    Mar. 5, 2009

(30) Foreign Application Priority Data
Apr. 22, 2005   (JP) ................................. 2005-124658

(51) Int. Cl.
*H04N 5/92*    (2006.01)
(52) U.S. Cl. ...................................................... 386/326
(58) Field of Classification Search .................. None
See application file for complete search history.

(56) References Cited

U.S. PATENT DOCUMENTS

| 5,841,475 | A  | * | 11/1998 | Kurihara et al. | ......... 375/240.15 |
| 6,272,179 | B1 |   | 8/2001  | Kadono          |                      |
| 6,411,771 | B1 | * | 6/2002  | Aotake          | ................ 386/282 |
| 2002/0059642 | A1 | * | 5/2002 | Russ et al.     | ...................... 725/135 |
| 2002/0102027 | A1 | * | 8/2002 | Miyake et al.   | ................ 382/239 |
| 2002/0172426 | A1 | * | 11/2002 | Honda et al.   | ................ 382/235 |
| 2002/0196853 | A1 | * | 12/2002 | Liang et al.    | ............. 375/240.16 |
| 2003/0016752 | A1 | * | 1/2003 | Dolbear et al.  | .......... 375/240.16 |
| 2003/0026342 | A1 | * | 2/2003 | Horiike et al.  | .......... 375/240.25 |

(Continued)

FOREIGN PATENT DOCUMENTS

EP    0 940 774    9/1999

(Continued)

OTHER PUBLICATIONS

International Search Report of Jun. 27, 2006 issued in the International Application No. PCT/JP2006/305380.

(Continued)

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

A control unit 102 of a digital broadcast receiver 100 finds a motion vector by performing encoding into an MPEG-4 format partially and records the found motion vector into a recording unit 103 as a motion vector stream 147 in parallel with processing to encode program contents into an MPEG-2 format and to record program contents 141 encoded in the MPEG-2 format into the recording unit 103. The control unit 102 then generates program contents in the MPEG-4 format from the program contents 141 in the MPEG-2 format and the motion vector stream 147 recorded in the recording unit 103 to enable use in another device 131.

28 Claims, 12 Drawing Sheets

U.S. PATENT DOCUMENTS

| | | | |
|---|---|---|---|
| 2003/0126445 A1* | 7/2003 | Wehrenberg | 713/176 |
| 2003/0153372 A1* | 8/2003 | Shimamura et al. | 455/575 |
| 2004/0008899 A1* | 1/2004 | Tourapis et al. | 382/251 |
| 2004/0013399 A1 | 1/2004 | Horiguchi et al. | |
| 2004/0101284 A1* | 5/2004 | Ando | 386/95 |
| 2004/0212832 A1* | 10/2004 | Shibata | 358/1.16 |
| 2005/0013365 A1* | 1/2005 | Mukerjee et al. | 375/240.16 |
| 2005/0015249 A1* | 1/2005 | Mehrotra et al. | 704/230 |
| 2005/0157784 A1* | 7/2005 | Tanizawa et al. | 375/240.03 |
| 2005/0179814 A1* | 8/2005 | Pau et al. | 348/448 |
| 2006/0013305 A1* | 1/2006 | Sun | 375/240.12 |
| 2006/0140277 A1* | 6/2006 | Ju | 375/240.25 |
| 2006/0233236 A1* | 10/2006 | Labrozzi et al. | 375/240.03 |

FOREIGN PATENT DOCUMENTS

| | | |
|---|---|---|
| JP | 9-84011 | 3/1997 |
| JP | 2000-299857 | 10/2000 |
| JP | 2002-152752 | 5/2002 |
| JP | 2003-32617 | 1/2003 |
| JP | 2003-116104 | 4/2003 |

OTHER PUBLICATIONS

Supplementary European Search Report issued Dec. 17, 2010 in Application No. EP 06 72 9370.

* cited by examiner

VIDEO INFORMATION RECORDING DEVICE, VIDEO INFORMATION RECORDING METHOD, AND RECORDING MEDIUM CONTAINING THE VIDEO INFORMATION RECORDING PROGRAM

TECHNICAL FIELD

An invention according to the present patent application (hereinafter, referred to as the invention) relates to a video information recording device, a video information recording method, a video information recording program, and a recording medium containing the video information recording program for receiving video information sent by individual or broadcast transmission using various types of cable or wireless networks to record the received video information.

BACKGROUND ART

As techniques relating to conventional video information recording device, video information recording method, video information recording program, and recording medium containing the video information recording program for receiving video information sent by individual or broadcast transmission using various types of cable or wireless networks to record the received video information, there is a moving picture coding system converting device described, for example, in Patent Document 1 specified below.

FIG. 8 shows a view schematically showing the configuration of a conventional moving picture coding system converting device 900, and FIG. 9 shows a procedure when the conventional moving picture coding system converting device 900 performs coding system conversion. Only the portions directly relating to the invention are shown in FIG. 8 and all the rest is omitted.

The conventional moving picture coding system converting device 900 first receives broadcasted video information at a reception unit 901 (S901). Subsequently, a channel selection and decoding unit 904 channel-selects program contents from the received video information and decodes the selected program contents (S902). Subsequently, a control unit 902 encodes the channel-selected and decoded program contents into the MPEG-2 format (S903), and records the program contents 941 encoded in the MPEG-2 format into a recording unit 903 (S904).

The format in this instance is not necessarily limited to the MPEG-2 format, and program contents 942 encoded in the MPEG-4 format can be recorded into the recording unit 903, or both the program contents 941 encoded in the MPEG-2 format and the program contents 942 encoded in the MPEG-4 format may be recorded into the recording unit 903.

However, there is a case where both the program contents 941 encoded in the MPEG-2 format and the program contents 942 encoded in the MPEG-4 format cannot be recorded into the recording unit 903 for reasons of copyright management, problems arising from a capacity of the recording unit 903 or the like, and in such a case, the contents in either one format alone are recorded into the recording unit 903.

Also, in this instance, the program contents in each format may be encoded with the use of an encryption and decryption key 944 and then recorded into the recording unit 903. The encryption and decryption key may be different from program contents to program contents or shared by several program contents. Also, a common key may be used for encryption and decryption, or different keys may be used for encryption and decryption.

Herein, a case is examined where the program contents 941 are used in a device 931 other than the moving picture coding system converting device 900 in which the program contents 941 are recorded. Assume that the moving picture coding system converting device 900 has recorded only the program contents 941 encoded in the MPEG-2 format in the recording unit 903 for reasons of copyright management or any other reason, whereas program contents encoded in the MPEG-4 format alone are available in another device 931.

In such a case, it becomes necessary to convert the program contents 941 encoded in the MPEG-2 format to the program contents 942 encoded in the MPEG-4 format. Accordingly, the control unit 902 in the moving picture coding system converting device 900 reads out the program contents 941 encoded in the MPEG-2 format from the recording unit 903 and decodes the program contents 941 first (S905). The control unit 902 then encodes the decoded program contents into the program contents 942 in the MPEG-4 format (S906).

In this instance, it is possible to encrypt the program contents by various methods at the same time or after a certain time. A key used for encryption can be the same as or different from the encryption and decryption key 944 and various keys can be used. Because this configuration is the same as in the case described above, detailed descriptions are omitted herein.

Subsequently, the control unit 902 writes the program contents 942 in the MPEG-4 format into an SD memory card 922 by way of an input and output unit 905 (S907). The program contents 942 in the MPEG-4 format recorded in the SD memory card 922 can be used in another device 931 (S908).

It should be noted that there is a case where the control unit 902 deletes the program contents 941 encoded in the MPEG-2 format and recorded in the recording unit 903 as soon as it has written the program contents 942 in the MPEG-4 format into the SD memory card 922 by way of the input and output unit 905 in Step S907 for reasons of copyright management or any other reason. Such deletion, however, is not necessarily performed for reasons of copyright management or any other reason.

Patent Document 2 discloses an image information converting device that generates MPEG-4 motion vector information from MPEG-2 motion vector information. When converting encoded data encoded in the MPEG-2 format to encoded data encoded in the MPEG-4 format, this image information converting device reduces a computation amount of motion vector computation by generating MPEG-4 motion vector information from MPEG-2 motion vector information when data of an MPEG-2 P-frame is converted to MPEG-4 P-VOP, and when data of an MPEG-2 I-frame is converted to MPEG-4 P-VOP, by calculating motion vector information of the P-VOP using the motion vector information of the immediately preceding P-VOP.

However, when the program contents 941 in the MPEG-2 format recorded in the former moving picture coding system converting device 900 are used in another device, it is necessary for the moving picture coding system converting device 900 to convert the program contents 941 in the MPEG-2 format to the program contents 942 in the MPEG-4 format. It takes an actual time to convert the program contents 941 in the MPEG-2 format to the program contents 942 in the MPEG-4 format. For example, when the program contents 941 are a one-hour long program, it takes one hour to convert the program contents 941 in the MPEG-2 format to the program contents 942 in the MPEG-4 format. This poses a problem that one hour is necessary to write the program contents 942 in the MPEG-4 format into an SD memory and the user has to wait all the while before he becomes able to use the program contents 942 in another device 931.

Such a problem can be avoided by generating the program contents 942 in the MPEG-4 format in the moving picture coding system converting device 900 and recording the program contents 942 in the recording unit 903 in advance. However, in some cases, it is prohibited to record both the program contents 941 in the MPEG-2 format and the program contents 942 in the MPEG-4 format for reasons of restrictions imposed by copyright management, problems arising from a capacity of the recording unit 903 or the like.

Meanwhile, the latter image information converting device has a problem as follows. FIG. 10 is a schematic view showing a macroblock used for MPEG-2 motion compensation. FIG. 11 is a schematic view showing a macroblock used for MPEG-4 motion compensation. FIG. 12 is a schematic view showing a reference frame for the H.264 standards. As is shown in FIG. 10, motion compensation is performed in the MPEG-2 standards with the use of a macroblock R1 of 16×16 pixels, and as is shown in FIG. 11, because a macroblock in closer color can be searched in the MPEG-4 standards, motion compensation is performed with the use of a macroblock R2 of 8×8 pixels. This means that a used macroblock is different for each coding system.

Also, in the H.264 standards, not only can the motion compensation be performed with the use of a macroblock R3 by setting the immediately preceding frame or the frame of a GOP (Group of Pictures) as the reference frame as is shown in the top row of FIG. 12, but also the motion compensation can be performed with the use of a macroblock R4 by setting frames over a broad range beyond the I-frame as the reference frames as is shown in the bottom row of FIG. 12. Image compression can be therefore performed more effectively. In this case, the conventional motion prediction with the use of a motion vector cannot be performed, and motion prediction has to be performed again.

As has been described, in the motion vector computation in the respective coding systems, such as MPEG-2, MPEG-4, and H.264, the range of reference frames, the unit of motion compensation, with or without the support for arbitrary shape coding are different for each coding system. Hence, the image information converting device is not able to find motion vector information optimized for the coding system after conversion. Consequently, in order to find motion vector information optimized for the coding system after conversion, it is also necessary for the image information converting device to perform motion vector computation again according to the coding system after conversion, and this computation takes a long time.

Patent Document 1: JP-A-9-84011
Patent Document 2: JP-A-2002-152752

DISCLOSURE OF THE INVENTION

An object of the invention is to provide a video information recording device, a video information recording method, a video information recording program, a recording medium containing the video information recording program for generating video information encoded using a given coding method from video information encoded using another coding method at an extremely high speed to enable the use in another device even when plural pieces of video information of the same contents encoded using different coding methods cannot be recorded in duplicate for reasons of restrictions imposed by copyright management, a recording capacity or the like.

A video information recording device in an aspect of the invention includes recording means for recording therein first encoded information generated by encoding video information containing given contents using a first coding method, and generation means for generating partial information used to generate second encoded information encoded using a second coding method different from the first coding method and containing the contents on the basis of the first encoded information, and the recording means records therein the partial information generated by the generation means together with the first encoded information.

In this video information recording device, because the partial information used to generate the second encoded information encoded using the second coding method different from the first coding method and containing the same contents on the basis of the first encoded information is recorded together with the first encoded information, it is possible to generate the second encoded information with the use of the first encoded information and the partial information. Consequently, even in a case where plural pieces of video information of the same contents encoded using different coding methods cannot be recorded in duplicate for reasons of restrictions imposed by copyright management, a recording capacity or the like, it is possible to generate video information encoded using a given coding method from video information encoded using another coding method at an extremely high speed to enable the use in another device.

BEST MODE FOR CARRYING OUT THE INVENTION

Hereinafter, a digital broadcast receiver, which is one embodiment of the invention of a video information recording device, a video information recording method, a video information recording program, and a recording medium containing the video information recording program for receiving video information sent by individual or broadcast transmission using various types of cable or wireless networks to record the received video information, will be described with reference to the drawings.

Figure 1:
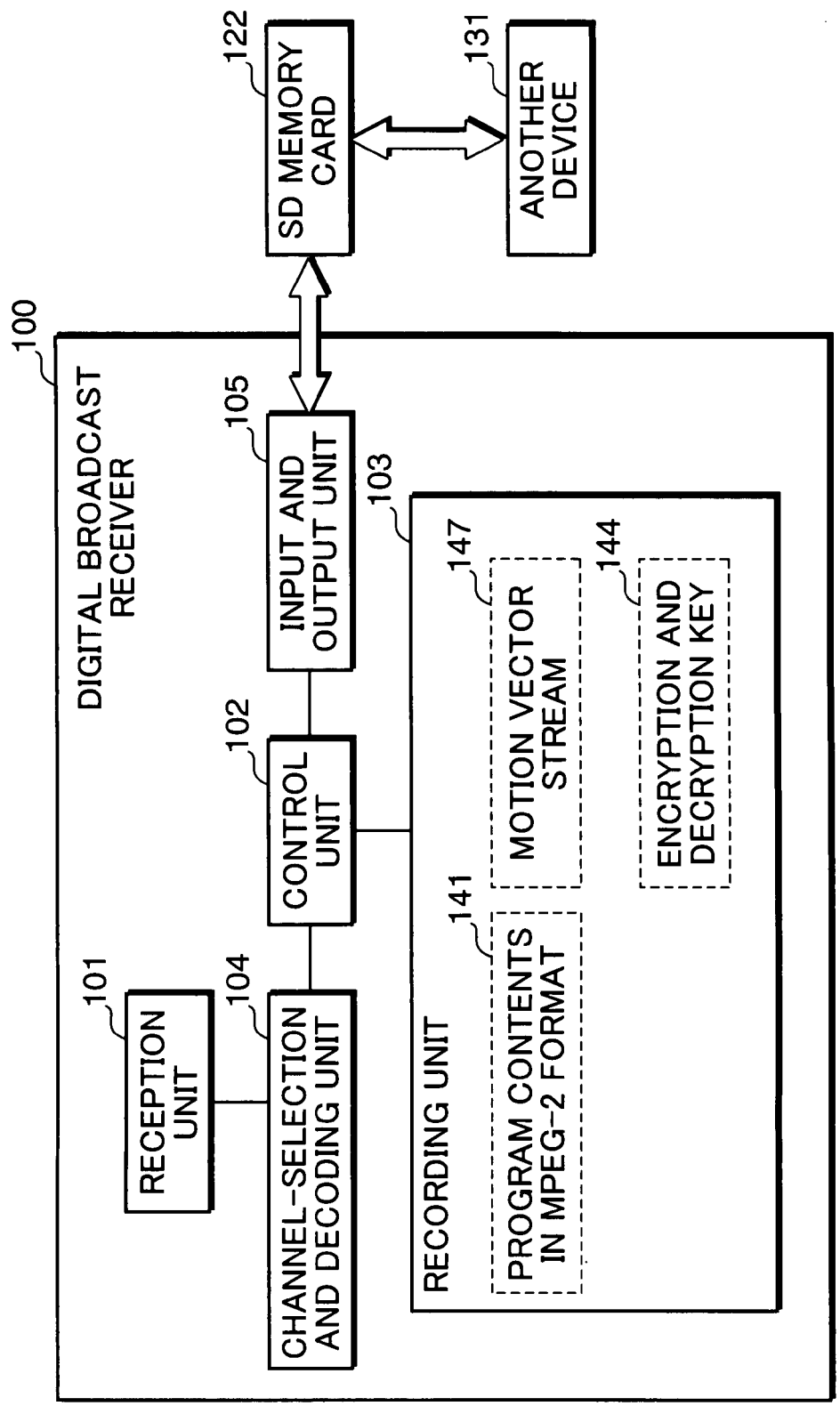
FIG. 1 is a view schematically showing the configuration of a digital broadcast receiver according to one embodiment of the invention.

FIG. 1 is a view schematically showing the configuration of a digital broadcast receiver according to one embodiment of the invention. Only the portions directly relating to the gist of the invention are shown in FIG. 1 and all the rest is omitted.

As is shown in FIG. 1, a digital broadcast receiver 100 includes a reception unit 101, a channel-selection and decoding unit 104, a control unit 102, a recording unit 103, and an input and output unit 105. The digital broadcast receiver 100 receives video information and encodes the program contents into the MPEG-2 format to record the resulting program contents 141 encoded in the MPEG-2 format into the recording unit 103, while at the same time, it finds a motion vector by performing the encoding into the MPEG-4 format entirely or partially to record the resulting motion vector stream 147 into the recording portion 103.

The digital broadcast receiver 100 also reads out the program contents 141 encoded in the MPEG-2 format from the recording unit 103 and decodes the program contents 141 first. It then generates program contents encoded in the MPEG-4 format from the decoded program contents when encoding the decoded program contents into program contents 142 in the MPEG-4 format using the motion vector stream 147 recorded in the recording unit 103.

The input and output unit 105 is formed so that an SD memory card 122 can be loaded therein. The digital broadcast receiver 100 records the program contents encoded in the MPEG-4 format into the SD memory card 122 loaded in the input and output unit 105. After the SD memory card 122 is removed from the digital broadcast receiver 100, it is loaded into another device 131, and this device 131 plays back the program contents in the MPEG-4 format recorded in the SD memory card 122.

Figure 2:
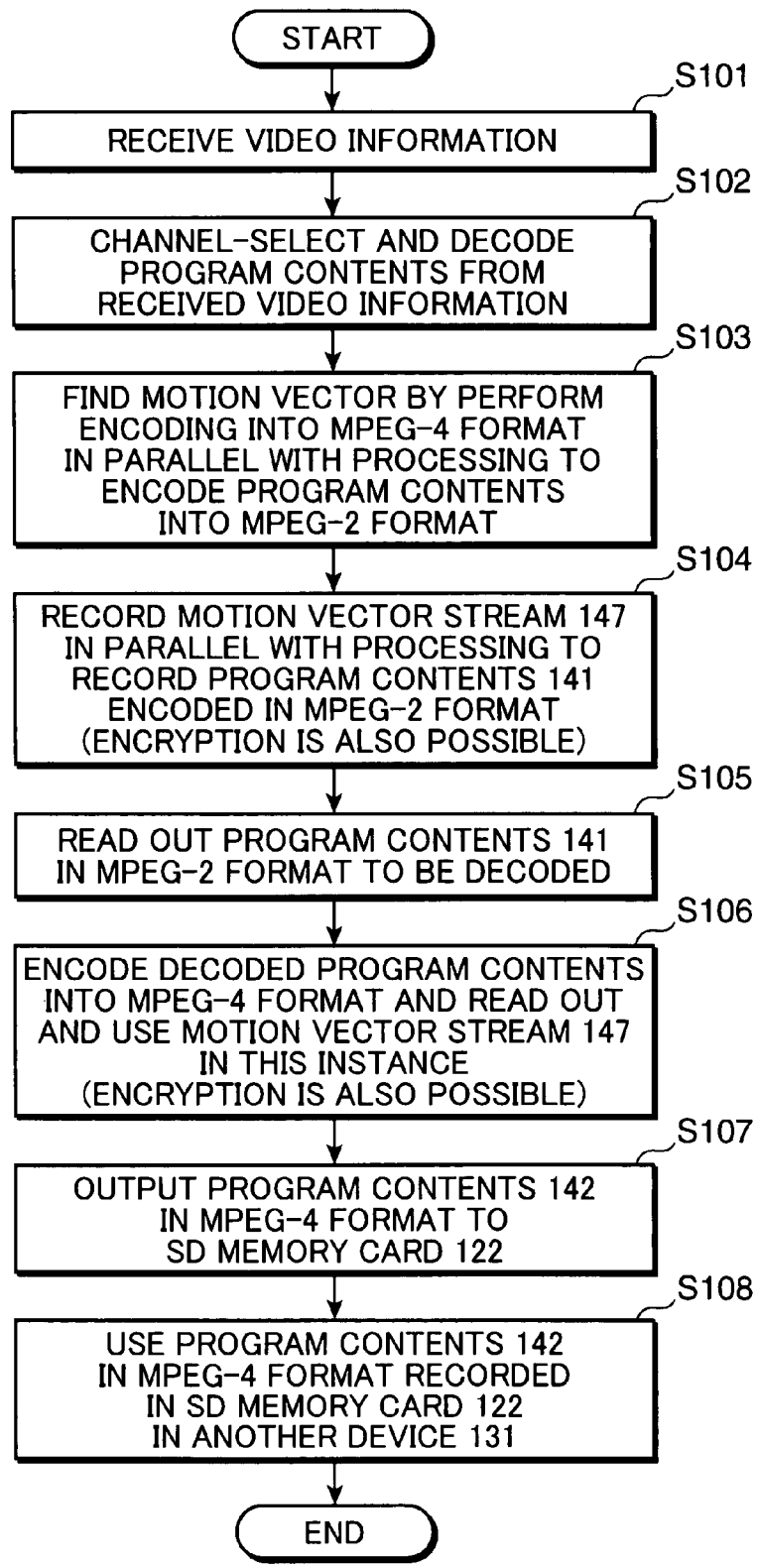
FIG. 2 is a flowchart showing the procedure when the digital broadcast receiver shown in FIG. 1 performs coding system conversion.

FIG. 2 is a flowchart showing the procedure for the digital broadcast receiver 100 shown in FIG. 1 to receive program contents and to record the program contents therein for the use in another device.

As is shown in FIG. 2, the reception unit 101 in the digital broadcast receiver 100 first receives video information sent by individual or broadcast transmission using various types of cable or wireless networks (S101). Subsequently, according to an instruction of the operator, the channel-selection and decoding unit 104 channel-selects the program contents from the received video information and decodes the channel-selected program contents (S102). Subsequently, the control unit 102 encodes the program contents into the MPEG-2 format (S103), and records the resulting program contents 141 encoded in the MPEG-2 format into the recording unit 103 (S104).

The format in this instance is not necessarily limited to the MPEG-2 format, and program contents 142 encoded in the MPEG-4 format can be recorded into the recording unit 103, or both the program contents 141 encoded in the MPEG-2 format and the program contents 142 encoded in the MPEG-4 format may be recorded into the recording unit 103. In a case where the received program contents are already encoded in the MPEG-2 format, the control unit 102 may record the received program contents 141 in the MPEG-2 format intactly into the recording unit 103 without encoding the program contents into the MPEG-2 format.

Also, in this instance, the control unit 102 may encrypt the program contents in each format using an encryption and decryption key 144 and then record the resulting program contents into the recording unit 103. The encryption and decryption key 144 may be different from program contents to program contents or shared by several program contents. Also, a common key may be used for encryption and decryption or different keys may be used for encryption and decryption.

Further, the program contents received at the reception unit 101 and channel-selected and decoded in the channel-selection and decoding unit 104 are not necessarily compressed information, such as those in the MPEG-2 format and the MPEG-4 format. The uncompressed program contents can be recorded intactly into the recording unit 103. The procedure up to this point is substantially the same as those by the conventional image coding system converting device 900.

However, there is a case where both the program contents 141 encoded in the MPEG-2 format and the program contents 142 encoded in the MPEG-4 format cannot be recorded in the recording unit 103 for reasons of copyright management or the like, and in such a case, the program contents in either one format alone are recorded into the recording unit 103.

The characteristic of the invention is shown when the contents in either one format alone are recorded into the recording unit 103 in a case where both the program contents 141 encoded in the MPEG-2 format and the program contents 142 encoded in the MPEG-4 format cannot be recorded in the recording unit 103 for reasons of copyright management or the like as described above.

When the MPEG-4 format and the MPEG-2 format are compared with each other, in general, the program contents are recorded at a normal TV image quality or a high-definition image quality in the MPEG-2 format, whereas in the MPEG-4 format, the program contents are recorded at the CIF (Common Intermediate Format) image quality or the like so as to be played back by a mobile device, such as a cellular phone. Hence, because the MPEG-2 format is thought to excel in the image quality, assume that the digital broadcast receiver 100 has recorded the program contents 141 in the MPEG-2 format alone in the recording unit 103.

However, like the problems described above, when the program contents 141 in the MPEG-2 format are used in another device, it becomes necessary to convert the program contents 141 in the MPEG-2 format into the program contents in the MPEG-4 format, and it takes an actual time to convert the program contents 141 in the MPEG-2 format to the program contents in the MPEG-4 format. For example, when the program contents 141 are a one-hour long program, it takes one hour to convert the program contents 141 in the MPEG-2 format to program contents in the MPEG-4 format. Hence, one hour is necessary to write the program contents in the MPEG-4 format into the SD memory 122 and the user has to wait all the while before he becomes able to use the resulting program contents in another device 131.

In the digital broadcast receiver 100 as one embodiment of the invention, the control unit 102 finds a motion vector by performing the encoding into the MPEG-4 format entirely or partially (S103) and records the motion vector thus found into the recording unit 103 as a motion vector stream 147 (S104) in parallel with the processing to encode the program contents into the MPEG-2 format (S103) and to record the program contents 141 encoded in the MPEG-2 format into the recording unit 103 (S104).

It should be noted that the coding processing into the MPEG-4 format and the calculation processing of the motion vector described above are not necessarily performed from the information encoded in the MPEG-2 format. They may be performed from the program contents before encoded into the MPEG-2 format, that is, those received at the reception unit 101 and channel-selected and decoded by the channel-selection and decoding unit 104. Alternatively, it may configured in such a manner that the information encoded in the MPEG-2 format is decoded first, and then the encoding into the MPEG-4 format is performed and the motion vector is found from the decoded information.

In addition, the control unit 102 does not necessarily encode the program contents into the MPEG-2 format, and the program contents received at the reception unit 101 and channel-selected and decoded in the channel-selection and decoding unit 104 may have been encoded in the MPEG-2 format.

According to the processing as above, the motion vector stream 147 recorded in the recording unit 103 contains the motion vector information alone and does not contain a DCT coefficient. It is therefore impossible to play back the program contents by the motion vector stream 147 alone, and there is no violation of copyright management or the like. In addition, because the data size of the motion vector information is generally smaller than that of the DCT information, when the recording capacity of the recording unit 103 is small, it is effective to calculate the motion vector information in advance so as to be recorded in the recording unit 103.

Herein, the procedure to find the motion vector by performing the encoding into the MPEG-4 format entirely or partially (S103) and to record the motion vector thus found into the recording unit 103 as the motion vector stream 147 (S104) will be described more in detail.

Initially, for ease of understanding of the procedure to record the motion vector stream 147 into the recording unit 103, the procedure to encode the program contents into the MPEG-4 format and to record the program contents encoded in the MPEG-4 format will be described with reference to FIG. 3 using the control unit 102 in the digital broadcast receiver 100 shown in FIG. 1 as an example.

Figure 3:
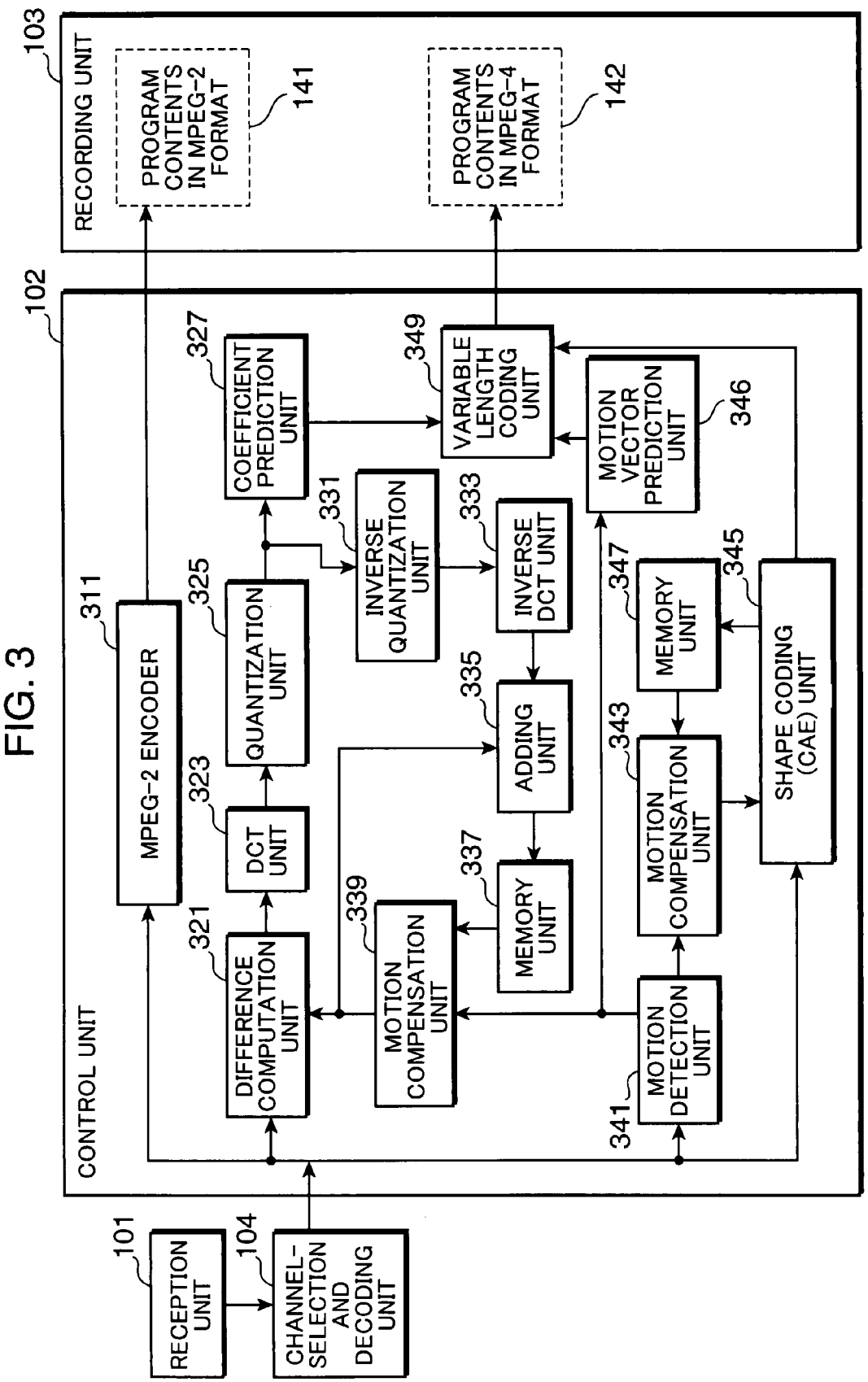
FIG. 3 is a circuit block diagram showing the major components used to record program contents encoded in the MPEG-4 format.

FIG. 3 is a circuit block diagram showing the major components in a case where the program contents 142 encoded in the MPEG-4 format are recorded into the recording unit 103. The following description is given for ease of convenience to make it easier to understand the procedure to record the motion vector stream 147 into the recording unit 103, which will be described below with reference to FIG. 4, and the program contents 141 encoded in the MPEG-2 format and the program contents 142 encoded in the MPEG-4 format are never recorded simultaneously in the recording unit 103 in the digital broadcast receiver 100 of this embodiment unless in the absence of restrictions imposed by copyright management, a recording capacity or the like.

A digital TV broadcast signal is first received at the reception unit 101 and channel-selected and decoded in the channel-selection and decoding unit 104. The procedure up to this point is the same as described above. The channel-selected and decoded program contents are then encoded into the program contents 141 in the MPEG-2 format by an MPEG-2 encoder 311 and recorded into the recording unit 103. This is also the same as described above, and because the MPEG-2 encoder 311 is not directly relevant to the gist of the invention, detailed descriptions thereof are omitted.

The procedure to encode the channel-selected and decoded program contents into the program contents 142 in the MPEG-4 format to be recorded into the recording unit 103 will now be described.

Initially, the program contents channel-selected and decoded in the channel-selection and decoding unit 104 are divided to macroblocks, which are the basic processing units, for each VOP (Video Object Plane, frame) in the control unit 102. The program contents are sent macroblock by macroblock to a difference computation unit 321 to find a difference from a motion-compensated optimal predictive macroblock described below.

The difference signal is sent to a DCT unit 323 and discrete cosine transform (DCT) is performed in the DCT unit 323. The DCT coefficient obtained by the DCT is sent to a quantization unit 325 and quantization of the DCT coefficient is performed. To be more concrete, a coding amount can be reduced by dividing the DCT coefficient by a specific value so as to be represented by a smaller number.

The coding amount is further reduced by adaptively calculating a predictive value and a predictive error for the quantized DCT coefficient by a coefficient prediction unit 327 according to the DC components and the AC components of an adjacent macroblock.

In a variable length coding unit 349, a predicted DCT coefficient is subjected to variable length coding together with the motion vector for which a prediction was made by a motion vector prediction unit 346 and shape coding information generated in a shape coding unit 345 described below. The program contents 142 in the MPEG-4 format are thus generated and recorded into the recording unit 103.

In addition, the DCT coefficient quantized in the quantization unit 325 is returned to the DCT coefficient before quantization in an inverse quantization unit 331, and is returned to the state before the discrete cosine transform in an inverse DCT unit 333. Further, data of the predictive macroblock from which the difference was found is added to the information returned to the state before discrete cosine transform in an adding unit 335. The original block is thus restored and the information thereof is recorded into a memory unit 337.

Respective divided macroblocks of each VOP are sent to a motion detection unit 341, and a motion vector having a small error is detected by the motion detection method including the block matching from a temporally nearby VOP on the basis of the forward prediction to make a prediction from the preceding VOP alone, the bidirectional prediction to make a prediction from both the preceding VOP and the succeeding VOP, and so forth. Further, motion vector information is generated in the motion detection unit 341 as a signal indicating a motion toward the predictive macroblock having the smallest error.

The motion vector information is sent to the motion vector prediction unit 346. In the motion vector prediction unit 346, a predictive value is calculated with the use of a motion vector of the adjacent macroblock and predicted motion vector information is generated from the predictive value and the motion vector information.

As described above, the predicted motion vector information is subjected to variable length coding in the variable length coding unit 349 together with the predicted DCT coefficient generated in the coefficient prediction unit 327 as well as shape coding information generated in the shape coding unit 345 described below. The program contents 142 in the MPEG-4 format are thus generated and recorded into the recording unit 103.

The motion vector information generated in the motion detection unit 341 is also sent to a motion compensation unit 339, and motion compensation is performed with the use of the macroblock information recorded in the memory unit 337. In the MPEG-4 standards, it is possible to perform motion compensation on a predictive signal for four luminance component (Y) blocks forming a macroblock with the use of a motion vector for each. In a case where motion compensation is performed block by block, because there are four motion vectors for one macroblock, an average of these four motion vectors is found and used as a motion vector of a color difference signal. The optimal predictive macroblock that is motion-compensated in the motion compensation unit 339 is sent to the difference computation unit 321 and used to find the difference for an input of macroblocks of the next VOP.

Further, the respective divided macroblocks of each VOP are also sent to the shape coding (CAE) unit 345. In the shape coding (CAE) unit 345, when a macroblock of interest is neither completely outside the VOP (ALL 0) nor completely inside the VOP (ALL 256), the shape information determined on the basis of whether the respective pixels fall within the object or outside the object is encoded by an arithmetic coding system called CAE (Context-based Arithmetic Encoding).

At the same time, in the motion detection unit 341, a motion vector for the shape information is detected apart from the motion vector of the luminance signal. The motion vector for the shape information is sent to the motion compensation unit 343 and is subjected to motion compensation together with the CAE coded shape information of the preceding VOP recorded in the memory unit 347. The motion-compensated shape information is sent to the shape coding (CAE) unit 345.

In the shape coding (CAE) unit 345, inter-VOP prediction is performed with the use of the CAE coded shape information of the current VOP and the motion-compensated, CAE coded shape information of the preceding VOP. The shape coding information, which is CAE coded and for which the inter-VOP prediction was performed, is sent to the variable length coding unit 349. As has been described above, in the variable length coding unit 349, the shape coding information is subjected to variable length coding together with the DCT coefficient and the motion vector. The program contents 142 in the MPEG-4 format are thus generated and recorded into the recording unit 103.

The procedure to find the motion vector by performing the encoding into the MPEG-4 format entirely or partially (S103) and to record the motion vector thus found into the recording unit 103 as the motion vector stream 147 (S104) will now be described using FIG. 4.

Figure 4:
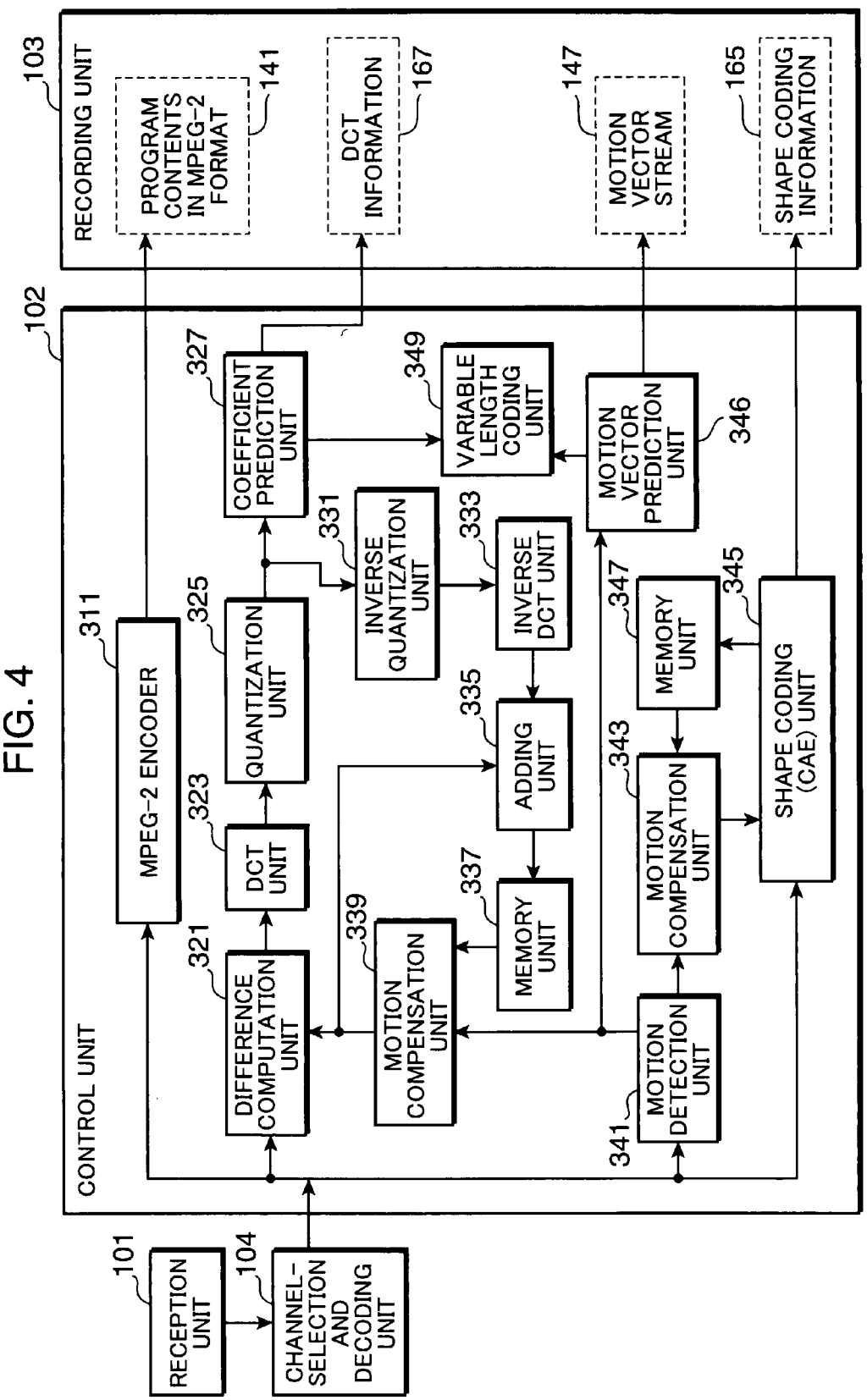
FIG. 4 is a circuit block diagram showing the major components used to record a part of information needed for the encoding into the MPEG-4 format into a recording unit by a control unit in the digital broadcast receiver shown in FIG. 1.

FIG. 4 is a circuit block diagram showing the major components used to record into the recording unit 103 a part of information needed to perform the encoding into the MPEG-4 format by the control unit 102 in the digital broadcast receiver 100 shown in FIG. 1.

As is shown in FIG. 4, because most of the procedure to find the motion vector by performing the encoding into the MPEG-4 format entirely or partially (S103) and to record the motion vector thus found into the recording unit 103 as the motion vector stream 147 (S104) is the same as the procedure to generate the program contents 142 encoded in the MPEG-4 format and to record the program contents 142 into the recording unit 103, descriptions of the same portion are omitted and only different portions will be described.

The respective divided macroblocks of each VOP are sent to the motion detection unit 341 and a motion vector having a small error is detected by the motion detection method including block matching from a temporally nearby VOP on the basis of the forward prediction to make a prediction from the preceding VOP alone, the bidirectional prediction to make a prediction from both the preceding VOP and the succeeding VOP, and so forth. Further, the motion vector information is generated in the motion detection unit 341 as a signal indicating a motion toward a predictive macroblock having the smallest error.

The motion vector information is sent to the motion vector prediction unit 346. In the motion vector prediction unit 346, a predictive value is calculated with the use of the motion vector of the adjacent macroblock and the predicted motion vector information is generated from the predictive value and the motion vector information. The predicted motion vector for which a prediction was made in the motion vector prediction unit 346 is recorded into the recording unit 103 as the motion vector stream 147 intactly or after it is encoded or formatted appropriately.

It may be configured in such a manner that the motion vector information is sent to the variable length coding unit 349 when the motion vector stream 147 is generated and recorded into the recording unit 103 so as to perform the processing to subject the motion vector information for which the prediction was made to the variable length coding in the variable length coding unit 349 together with the DCT coefficient and the shape coding information.

Likewise, any other processing performed when the program contents 142 encoded in the MPEG-4 format are generated and recorded into the recording unit 103, for example, DCT, quantization of the DCT coefficient, motion compensation, prediction of the DCT coefficient, variable length coding including the predicted DCT coefficient, generation and motion compensation of the CAE coded shape information, prediction of the shape information, variable length coding including the predicted, CAE coded shape information, and so forth may be performed as well or may not be performed.

Generally, a case where the foregoing processing is not performed is thought to be effective in reducing power consumption, whereas a case where the foregoing processing is performed is thought to be effective in ensuring consistency when the program contents 142 encoded in the MPEG-4 format are recorded into the recording unit 103. However, there is an exception in each case and the embodiment that best suits each case can be selected.

In either case, it is acceptable whether the program contents 142 in the MPEG-4 format subjected to the variable length coding in the variable length coding unit 349 are generated or not. However, it should be noted that at least the program contents 142 will never be recorded into the recording unit 103.

A case where the program contents 141 are used in a device 131 other than the digital broadcast receiver 100 in which are recorded the program contents 141 will be discussed.

Assume that the digital broadcast receiver 100 has recorded the program contents 141 encoded in the MPEG-2 format and the motion vector stream 147 alone in the recording unit 103 for reasons of copyright management or any other reason, and program contents encoded in the MPEG-4 format alone are available in the device 131. In such a case, it is necessary to convert the program contents 141 encoded in the MPEG-2 format to the program contents 142 encoded in the MPEG-4 format, and the processing as follows will be performed.

Referring to FIG. 2 again, the control unit 102 in the digital broadcast receiver 100 reads out the program contents 141 encoded in the MPEG-2 format from the recording unit 103 and decodes the program contents 141 first (S105). The control unit 102 then encodes the decoded program contents into the program contents 142 in the MPEG-4 format (S106). It is possible to encrypt the program contents 142 in the MPEG-4 format by various methods simultaneously or after a certain time (S106).

In this instance, the control unit 102 reads out the motion vector stream 147 from the recording unit 103 and uses it to encode the decoded program contents into the program contents 142 in the MPEG-4 format. By using the motion vector stream 147 found in advance, it is possible to significantly shorten a time needed to encode the program contents into the program contents 142 in the MPEG-4 format.

As has been described, it takes an actual time to encode the program contents into the program contents 142 in the MPEG-4 format. However, by analyzing the processing contents in detail, it is understood that the processing that requires an actual time is the processing to find a motion vector, such as motion detection, motion compensation, and predictive error calculation.

Hence, because it is thought that the video information is normally broadcasted over an actual time, if the control unit 102 finds the motion vector by performing the encoding into the MPEG-4 format (S103) in parallel with the processing to encode the program contents into the MPEG-2 format (S103) and to record the program contents 141 encoded in the MPEG-2 format into the recording unit 103 (S104) as described above, no extra time is required.

Also, when the screen size is the same for the program contents 141 encoded in the MPEG-2 format and the program contents 142 encoded in the MPEG-4 format, the DCT coefficient of the I frame of the program contents 141 encoded in the MPEG-2 format can be also used. The speed can be therefore increased further.

The control unit 102 then writes the program contents 142 in the MPEG-4 format into the SD memory card 122 by way of the input and output portion 105 (S107). The user is thus able to use the program contents 142 encoded the MPEG-4 format that is now recorded in the SD memory card 122 in another device 131 (S108).

The procedure to convert the program contents 141 encoded in the MPEG-2 format into the program contents 142 encoded in the MPEG-4 will now be described using FIG. 5.

Figure 5:
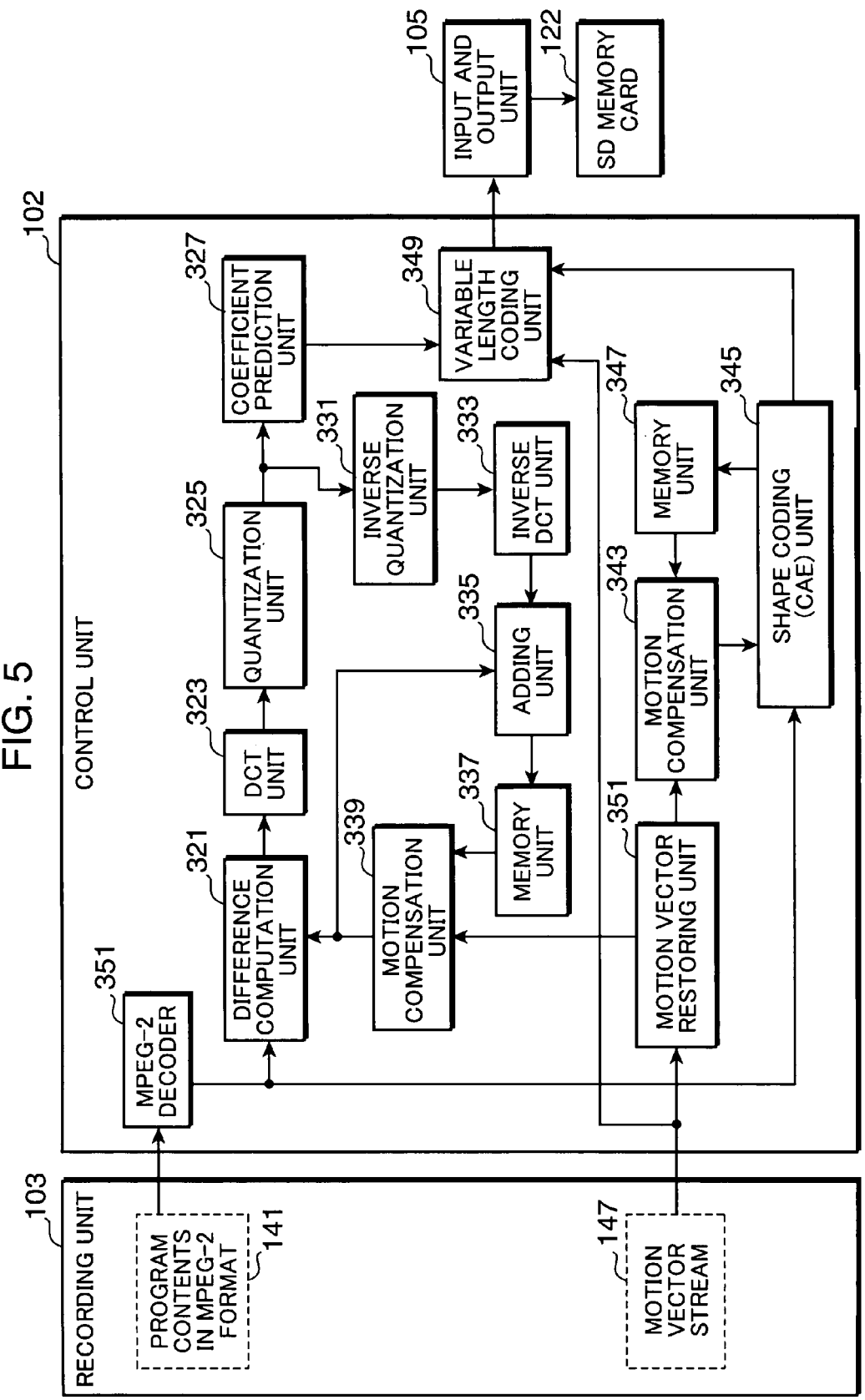
FIG. 5 is a circuit block diagram showing the major components used to convert program contents encoded in the MPEG-2 format into program contents encoded in the MPEG-4 format by the control unit in the digital broadcast receiver shown in FIG. 1.

FIG. 5 is a circuit block diagram showing the major components used to convert the program contents 141 encoded in the MPEG-2 format into the program contents 142 encoded in the MPEG-4 format by the control unit 102 in the digital broadcast receiver 100 shown in FIG. 1.

Initially, an MPEG-2 decoder 351 in the control unit 102 reads out the program contents 141 encoded in the MPEG-2 format from the recording unit 103 and decodes the program contents 141, after which it outputs the decoded program contents macroblock by macroblock to the difference computation unit 321 and the shape coding (CAE) unit 347.

Subsequently, the difference computation unit 321 finds a difference between the respective divided macroblocks of each VOP and the motion-compensated optimal predictive macroblock, and the DCT unit 323 performs discrete cosine transform. Also, the quantization unit 325 performs quantization of the DCT coefficient, and the coefficient prediction unit 327 adaptively calculates the predictive value and the predictive error according to the DC components and the AC components of the adjacent macroblock and outputs the predicted DCT coefficient to the variable length coding unit 349.

In this instance, the inverse quantization unit 331 returns the DCT coefficient quantized in the quantization unit 325 to the DCT coefficient before quantization, and the inverse DCT unit 333 returns the DCT coefficient before quantization to the state before the discrete cosine transform. The adding unit 335 adds the data of the predictive macroblock from which the difference was found to the information returned to the state before the discrete cosine transform. The original macroblock is thus restored and the information thereof is recorded in the memory unit 337.

Also, a motion vector restoring unit 351 reads out the motion vector stream 147 from the recording unit 103 and restores the predicted motion vector information to the motion vector information that is outputted to the motion compensation unit 339. The motion compensation unit 339 performs motion compensation using the macroblock information recorded in the memory unit 337, and the difference computation unit 321 finds a difference between the macroblock of the next VOP and the motion-compensated optimal predictive macroblock.

At the same time, the motion vector restoring unit 351 restores the motion vector for the shape information apart from the motion vector of the luminance signal. The motion compensation unit 343 performs motion compensation using the motion vector for the shape information and the CAE coded shape information of the preceding VOP recorded in the memory unit 347, and outputs the motion-compensated shape information to the shape coding (CAE) unit 345.

The shape coding (CAE) unit 345 performs inter-VOP prediction using the CAE coded shape information of the current VOP and the motion-compensated, CAE coded shape information of the preceding VOP, and outputs the shape coding information to the memory unit 347 and the variable length coding unit 349.

The variable length coding unit 349 reads out the motion vector stream 147 from the recording unit 103, and subjects the motion vector stream 147, the DCT information outputted from the coefficient prediction unit 327, and the shape coding information outputted from the shape coding (CAE) unit 345 to variable length coding to generate the program contents in the MPEG-4 format that are outputted to the input and output unit 105. The input and output unit 105 records the program contents in the MPEG-4 format into the SD memory card 122. The user is thus able to use the program contents 142 in the MPEG-4 format that is now recorded in the SD memory card 122 in another device 131.

The above has described a case where the digital broadcast receiver 100 converts the program contents 141 encoded in the MPEG-2 format into the program contents 142 encoded in the MPEG-4 format by way of example. However, it may be configured in such a manner that the program contents 141 encoded in the MPEG-2 format and the motion vector stream 147 are recorded into the SD memory card 122, and the processing described above is performed in another device 131 using the program contents 141 encoded in the MPEG-2 format and the motion vector stream 147 recorded in the SD memory card 122.

The above has described a case where the encoding into the MPEG-4 format is performed entirely or partially (S103) and the motion vector stream 147 alone is recorded as the information to be recorded in the recording unit 103 in parallel with the processing to encode the program contents into the MPEG-2 format (S103) and to record the program contents 141 encoded in the MPEG-2 format into the recording unit 103 (S104).

It should be appreciated, however, that the information to be recorded into the recording unit 103 by performing the encoding into the MPEG-4 entirely or partially in parallel with the processing to record the program contents 141 encoded in the MPEG-2 format into the recording unit 103 is not necessarily limited to the motion vector stream 147.

More specifically, as has been understood from the description above, any information is available as long as it is information that is effective for performing MPEG-4 encoding at high speeds when the encoding into the MPEG-4 format is performed later on the basis of the program contents 141 encoded in the MPEG-2 format and that alone is not able to restore the program contents.

The reason why the first condition is required is because the purpose of the information is to perform the MPEG-4 encoding at high speeds later. The reason why the second condition is required is because it is prohibited to restore the program contents by the information alone at the request of copyright management. Besides the motion vector stream 147 described above, concrete examples of such information satisfying the two conditions include but not limited to the DCT information and the shape coding information.

The procedure to record these DCT information and the shape coding information into the recording unit 103 instead of the motion vector stream 147 or together with the motion vector stream 147 will be described hereinafter using FIG. 4.

Processing to record the DCT information 167 into the recording unit 103 will be described first. As is shown in FIG. 4, most of the procedure to find the DCT coefficient by performing the encoding into the MPEG-4 format entirely or partially and to record the DCT coefficient thus found into the recording unit 103 as the DCT information 167 is the same as the procedure to generate the program contents 142 encoded in the MPEG-4 format and to record the program contents 142 into the recording unit 103.

The respective divided macroblocks of each VOP are sent to the difference computation portion 321 to find a difference from the motion-compensated optimal predictive macroblock. The difference signal is then sent to the DCT unit 323 and the discrete cosine transform is performed in the DCT unit 323. The DCT coefficient obtained by the DCT is sent to the quantization unit 325 and quantization of the DCT coefficient is performed.

In the coefficient prediction unit 327, a predictive value and a predictive error are calculated adaptively for the quantized DCT coefficient according to the DC components and the AC components of the adjacent macroblock, which further reduces a coding amount. The predicted DCT coefficient for which a prediction was made in the coefficient prediction unit 327 is recorded into the recording unit 103 as the DCT information 167 intactly or after it is encoded or formatted appropriately.

It may be configured in such a manner that the DCT coefficient is sent to the variable length coding unit 349 when the DCT information 167 is generated and recorded into the recording unit 103 so as to perform the processing to subject the predicted DCT coefficient to variable length coding in the variable length coding unit 349 together with the motion vector and the shape coding information.

Likewise, any other processing performed when the program contents 142 encoded in the MPEG-4 format are generated and recorded into the recording unit 103, for example, calculation of the motion vector, motion compensation, prediction of the motion vector, variable length coding including the predicted motion vector, generation and motion compensation of the CAE coded shape information, prediction of the shape information, variable length coding including the predicted, CAE coded shape information, and so forth may be performed as well or may not be performed.

Even when the DCT information 167 is recorded in the recording unit 103, it will not be played back in the form of an exact video without the motion vector, which lowers the risk involved with copyright management. Further, because restoration of the DCT information 167 becomes extremely difficult by recording only one of or neither of a quantization table and a Huffman table needed to restore the DCT information 167 to an uncompressed video, the risk involved with copyright management can be lowered further.

The processing to record the shape coding information 165 into the recording unit 103 will now be described. As is shown in FIG. 4, most of the procedure to find the shape coding information 165 by performing the encoding into the MPEG-4 format entirely or partially and to record the shape coding information 165 thus found into the recording unit 103 is the same as the procedure to generate the program contents 142 encoded into the MPEG-4 format and to record the program contents 142 into the recording unit 103.

The respective divided macroblocks of each VOP are sent to the shape coding (CAE) unit 345. In the shape coding (CAE) unit 345, when the macroblock is neither completely outside the VOP (ALL 0) nor completely inside the VOP (ALL 265), the shape information determined on the basis of whether the respective pixels fall within the object or outside the object is encoded by the arithmetic coding system called CAE.

At the same time, in the motion detection unit 341, the motion vector for the shape information is detected apart from the motion vector of the luminance signal. The motion vector for the shape information is sent to the motion compensation unit 343 and subjected to motion compensation together with the CAE coded shape information of the preceding VOP recorded in the memory unit 347. The motion-compensated shape information is sent to the shape coding (CAE) unit 345.

In the shape coding (CAE) unit 345, inter-VOP prediction is performed with the use of the CAE coded shape information of the current VOP and the motion-compensated, CAE coded shape information of the preceding VOP. The predicted shape coding information for which a prediction was made in the shape coding (CAE) unit 345 is recorded into the recording unit 103 as the shape coding information 165 intactly or after it is encoded or formatted appropriately.

It may be configured in such a manner that the shape coding information is sent to the variable length coding unit 349 when the shape coding information 165 is generated and recorded into the recording unit 103 so as to perform the processing to subject the shape coding information for which a prediction was made to variable length coding in the variable length coding unit 349 together with the DCT coefficient and the motion vector information.

Likewise, any other processing performed when the program contents 142 encoded in the MPEG-4 format are generated and recorded into the recording unit 103, for example, calculation of the DCT coefficient, motion compensation, prediction of the DCT coefficient, variable length coding including the predicted DCT coefficient, calculation of the motion vector, motion compensation, prediction of the motion vector, variable length coding including the predicted motion vector, and so forth may be performed as well or may not be performed.

As has been described, in a case where the DCT information 167 or the shape coding information 165 is recorded into the recording unit 103 instead of the motion vector stream 147, when the encoding into the MPEG-4 format is performed later on the basis of the program contents 141 encoded in the MPEG-2 format, the DCT information 167 or the shape coding information 165 recorded in the recording unit 103 is used to perform the MPEG-4 encoding at high speeds.

Three kinds of information, the motion vector stream 147, the DCT information 167, and the shape coding information 165, have been described above as the information that is effective in performing the MPEG-4 encoding at high speeds when the encoding into the MPEG-4 format is performed later on the basis of the program contents 141 encoded in the MPEG-2 format and that alone is not able to restore the program contents. The information, however, may be the information other than the foregoing or a combination of some of the foregoing.

The information is not particularly limited to the motion vector stream 147, the DCT information 167, and the shape coding information 165, and in the moving picture compression standards other than the MPEG standards, for example, the H.264 standards, various kinds of information can be recorded as long as it is information that requires a calculation time unique to the compression standards and that alone is not able to play back a video perfectly. For example, data for error recovery, intermediate data, and so forth may be recorded.

The information can be selected depending on a recordable capacity of the recording unit 103 equipped in the digital broadcast receiver or the SD memory card 122. Also, when a recordable capacity of the recording unit 103 or the SD memory card 122 is relatively small, it is one of effective methods to select the motion vector stream 147 preferentially.

As a similar method, a P-frame or a B-frame alone may be calculated and recorded into the recording unit 103 in advance, so that an I-frame alone is calculated when the encoding into the MPEG-4 format is performed later on the basis of the program contents 141 encoded in the MPEG-2 format.

Figure 6:
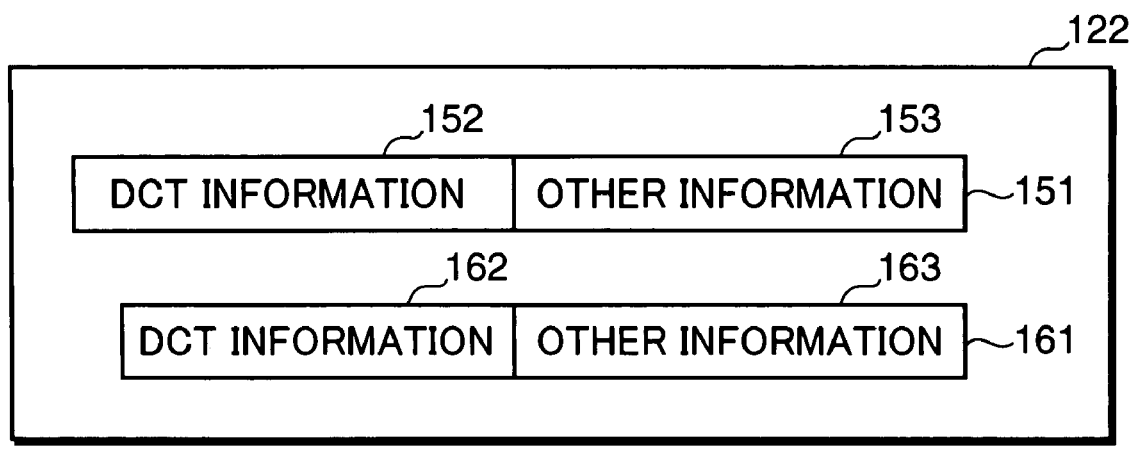
FIG. 6 is a schematic view showing an example of program contents recorded in an SD memory card.

In a case where the motion vector stream and the shape coding information can be recorded but the DCT information cannot be recorded entirely for reasons of restrictions imposed by copyright, an amount of recording data of the DCT coefficient may be changed in response to a memory capacity of the SD memory card 122. FIG. 6 is a schematic view showing an example of the program contents recorded in the SD memory card 122.

As is shown in FIG. 6, program contents 151 in the MPEG-2 format as an entire given program G and program contents 161 in the MPEG-4 format as a part of the program G (information used when the program contents 151 are converted to program contents in the MPEG-4 format at high speeds) are recorded in the SD memory card 122. The program contents 151 are made up of all DCT information 152 needed to play back the program G and information 153 needed to play back the program G other than the DCT information, such as motion vectors. The program contents 161 are made up of DCT information 162 which is a part of the program G and information 163 needed to play back the program G other than the DCT information, such as motion vectors.

The control unit 102 detects an available memory capacity of the SD memory card 122 and records the DCT information 162 selected by any selection method described below according to the detected available memory capacity by means of the input and output portion 150.

(1) The DCT information is selected according to a temporal position of the video information. For example, it may be configured in such a manner that a playback time of the program G corresponding to the capacity determined as recordable on the basis of the available memory capacity of the SD memory card 122 is calculated, so that the DCT information up to this playback time is recorded into the SD memory card 122 while the DCT information after the playback time is not recorded therein. The determination method on the basis of the temporal position is not particularly limited to the example above, and for example, it may be configured in such a manner so as not to record the DCT information of a playback time of multiples of a given number.

(2) the DCT information is selected by a spatial position of the video information. For example, it may be configured in such manner that a particular portion of each frame of the program G corresponding to a capacity determined as recordable on the basis of the available memory capacity of the SD memory card 122 is calculated, so that the DCT information for the particular portion in each frame is recorded into the SD memory card 122 while the DCT information in portions other than the particular portion is not recorded therein.

(3) The DCT information is selected according to color components of the video information. For example, in a case where a video signal of YUV components is used, it may be configured in such a manner that the DCT information of the UV components is recorded into the SD memory card 122 while the DCT information of the Y component is not recorded therein.

(4) Information to be recorded is selected according to a calculation time of the information. For example, it may be configured in such a manner that information that requires a considerable time for calculation is recorded with a higher propriety and information that does not require a considerable time for calculation is recorded with a lower priority.

Figure 7:
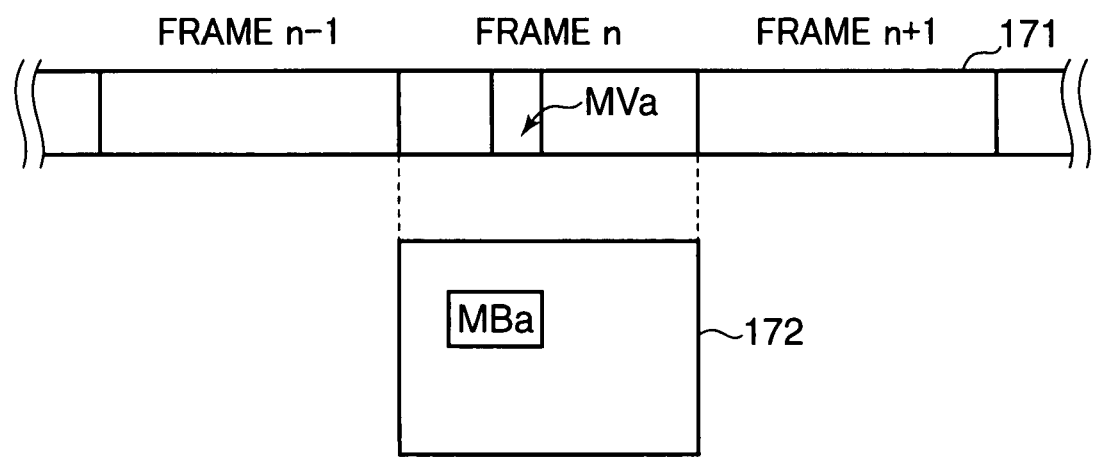
FIG. 7 is a view showing the relation between a stream and a frame image in the MPEG-4 format.
Figure 8:
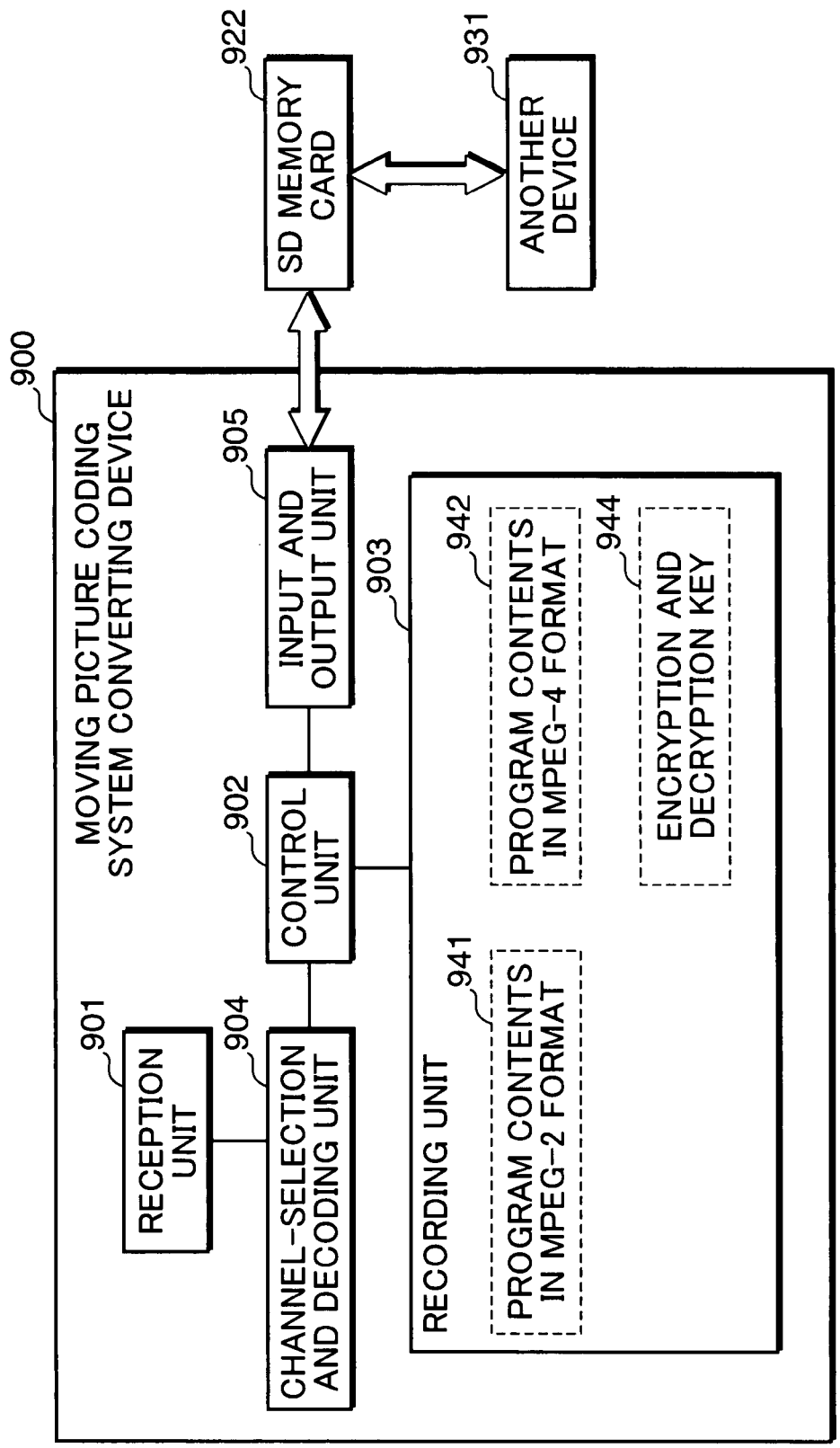
FIG. 8 is a view schematically showing the configuration of a conventional moving picture coding system converting device.
Figure 9:
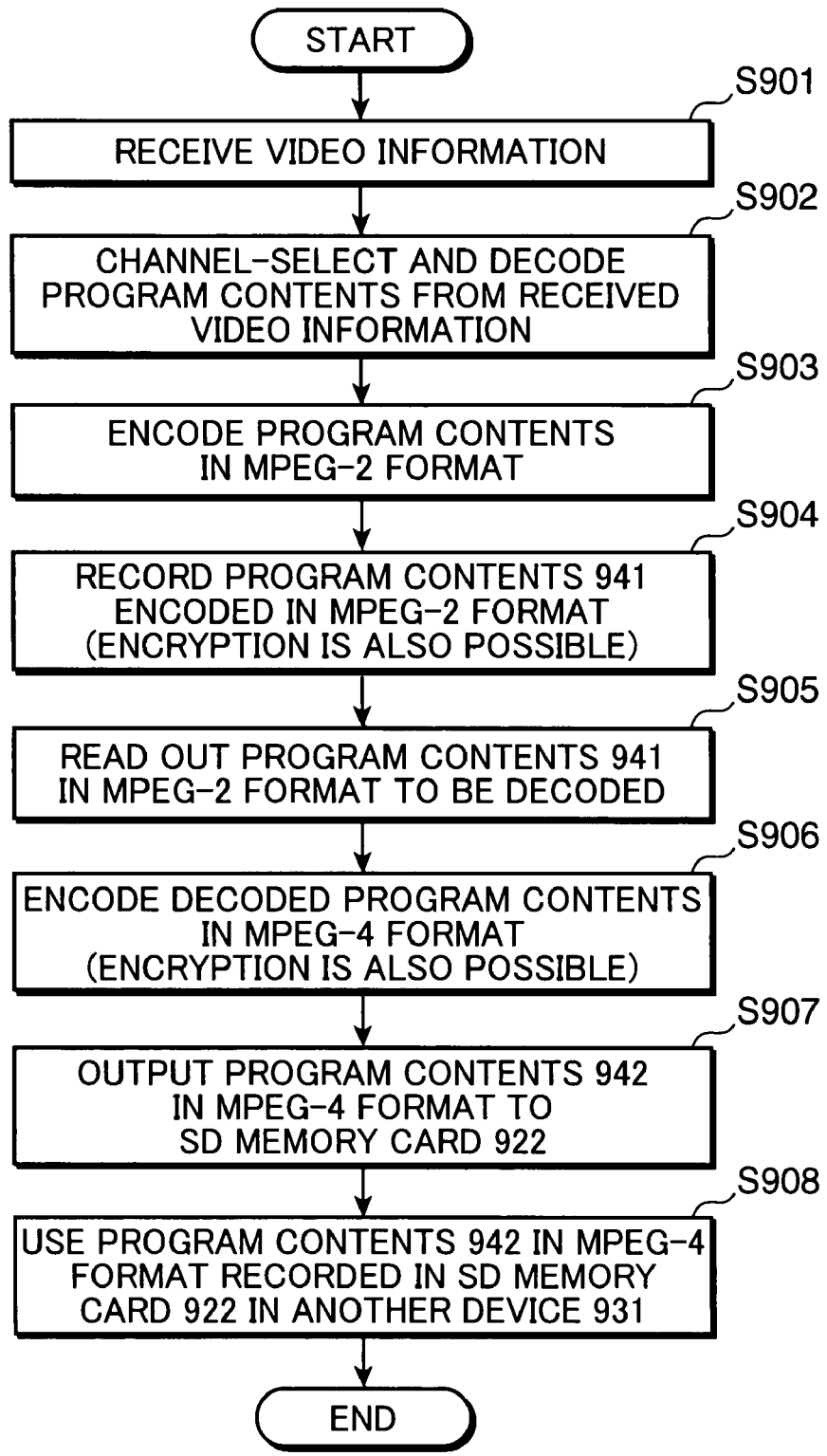
FIG. 9 is a view showing the procedure when the conventional moving picture coding system converting device performs coding system conversion.
Figure 10:
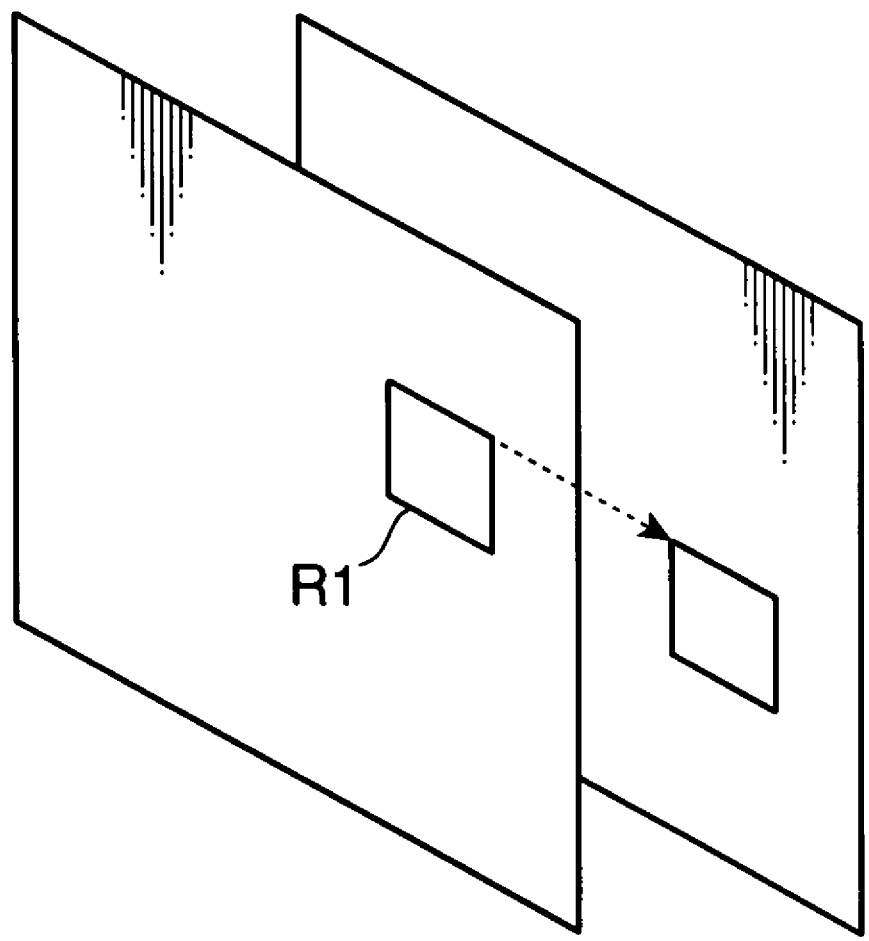
FIG. 10 is a schematic view showing a macroblock used for MPEG-2 motion compensation.
Figure 11:
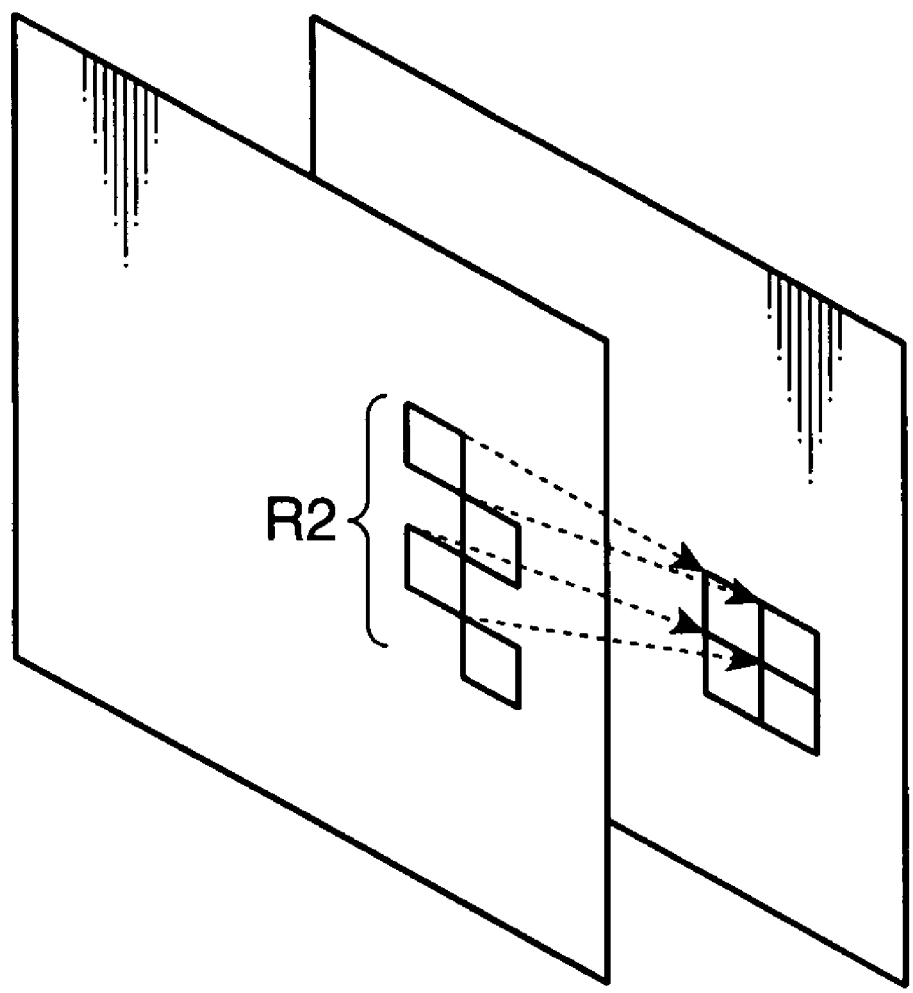
FIG. 11 is a schematic view showing a macroblock used for MPEG-4 motion compensation.
Figure 12:
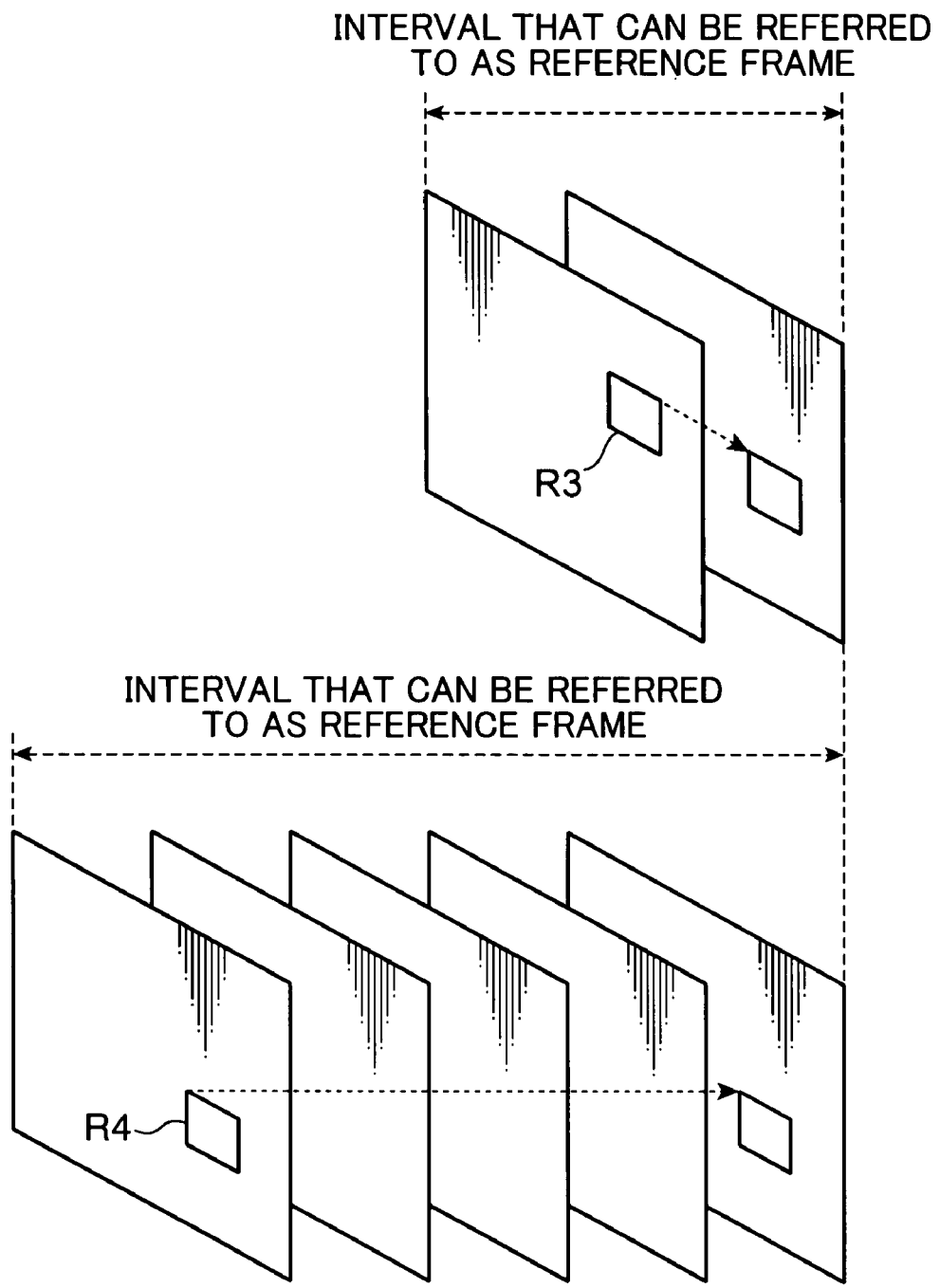
FIG. 12 is a schematic view showing a reference frame in the H.264 standards.

A handling method when the user turns OFF the power supply of the digital broadcast receiver 100 while the control unit 102 is writing the program contents in the MPEG-4 format generated by the conversion processing described above into the SD memory card 122 will now be described. FIG. 7 is a view showing the relation between the stream and a frame image in the MPEG-4 format.

As is shown in FIG. 7, assume that a stream 171, which is the program contents in the MPEG-4 format, has been recorded into the SD memory card 122 before the power supply is shut OFF, and let MBa be a given macroblock in an original image 172 in the frame n of the stream 171 and let MVa be a motion vector and a difference of the stream 171 corresponding to the macroblock MBa.

When the user turns ON the power supply of the digital broadcast receiver 100 later, the control unit 102 reads out the stream 171 from the SD memory card 122 for the encoding of the frame n, and decodes the stream 171 using an internal MPEG-4 decoder (not shown) to compare an image obtained from the motion vector and difference MVa with the macroblock MBa of an original image 173 of the frame n. When the difference therebetween is equal to or smaller than a specific threshold value, the control unit 102 determines the motion vector and difference MVa as being appropriate and uses the motion vector and difference MVa without performing the motion prediction processing for the macroblock MBa in the original image 173. Consequently, because it is possible to omit the motion prediction processing that takes the longest time at the time of encoding, even when the encoding is accidentally interrupted due to the shut OFF of the power supply, it is still possible to shorten a time needed to perform the encoding again later.

This embodiment described a method in which by generating and recording in advance the program contents 141 in the MPEG-2 format and the motion vector stream 147 used to perform the encoding into the MPEG-4 format, the MPEG-4 encoding can be performed at high speeds when the encoding into the MPEG-4 format is performed later on the basis of the program contents 141 encoded in the MPEG-2 format. The invention, however, is not necessarily limited to the example above, and the invention is also applicable to a case where program contents information encoded in a given coding system on the basis of program contents information encode by other various coding systems.

For example, by generating and recording in advance the program contents information encoded in the MPEG-4 format and information needed to generate program contents information encoded in the MPEG-2 format from the firstly mentioned program contents, in particular, the information that takes a long time for generation, for example, motion vector information used for the encoding into the MPEG-2 format, the MPEG-2 encoding can be performed at high speeds when the encoding into the MPEG-2 is performed later on the basis of the program contents encoded in the MPEG-4 format.

In particular, in a case where the digital broadcast receiver 100 is a mobile device or a portable device, it is often that the program contents information or the like is recorded in the MPEG-4 format due to the restrictions imposed by the specification and the performance of a mobile device or the like, and it is further often that a capacity of the recording unit 103 is limited. In such a case, because the motion vector information generated and recorded in advance has a relatively small data size, it is possible to perform the coding processing from the MPEG-4 format to the MPEG-2 format or to record the information needed to perform the processing at high speeds without making a large demand for a memory capacity of the recording unit 103.

The procedure for the digital broadcast receiver 100 to receive and record the program contents to enable the use in another device is an embodiment of the video information recording method of the present patent application, and the digital broadcast receiver 100 and the control unit 102 may be implemented by a microcomputer and a program that controls the operations thereof. Also, the program is an embodiment of the video information recording program according to the present patent application, and recorded and held in a recording medium, such as a semiconductor memory like a RAM or a ROM, an HDD, and a DVD, that records information therein by the magnetic method, the optical method, a combination thereof or other various methods, and the recording medium is one embodiment of a recording medium containing the video information recording program of the invention.

Also, the embodiment above described a case where the processing to find the motion vector by performing the encoding into the MPEG-4 format entirely or partially and the processing to read out the motion vector stream 147 from the recording unit 103 to be used to encode the decoded program contents into the program contents 142 in the MPEG-4 format when the program contents 141 encoded in the MPEG-2 format is read out from the recording unit 103 to be decoded first, and then the decoded program contents are encoded into the program contents 142 in the MPEG-4 format are performed in parallel with the processing to encode the program contents into the MPEG-2 format and to record the program contents 141 encoded in the MPEG-2 format into the recording unit 103 in the same digital broadcast receiver 100. However, each processing may be performed by a different device or equipment.

As has been described above, a video information recording device of the invention includes recording means for recording therein first encoded information generated by encoding video information containing given contents using a first coding method, and generation means for generating partial information used to generate second encoded information encoded using a second coding method different from the first coding method and containing the contents from the first encoded information, and the recording means records the partial information generated by the generation means together with the first encoded information.

A video information recording method of the invention includes a step of recording first encoded information generated by encoding video information containing given contents using a first coding method into recording means, a step of generating partial information used to generate second encoded information encoded using a second coding method different from the first coding method and containing the contents from the first encoded information, and a step of recording the thus-generated partial information into the recording means together with the first encoded information.

A video information recording program of the invention causes a computer to function as recording means for recording therein first encoded information generated by encoding video information containing given contents using a first coding method, and generation means for generating partial information used to generate second encoded information encoded using a second coding method different from the first coding method and containing the contents from the first encoded information, and the recording means records therein the partial information generated by the generation means together with the first encoded information.

A recording medium of the invention is a computer-readable recording medium containing a video information recording program characterized by causing a computer to function as: recording means for recording therein first encoded information generated by encoding video information containing given contents using a first coding method, and generation means for generating partial information used to generate second encoded information encoded using a second coding method different from the first coding method and containing the contents from the first encoded information, wherein the recording means records therein the partial information generated by the generation means together with the first encoded information.

According to the respective configurations described above, because the partial information used to generate the second encoded information encoded using the second coding method different from the first coding method and containing the same contents from the first encoded information is recorded together with the first encoded information, it is possible to generate the second encoded information with the use of the first encoded information and the partial information. Consequently, even in a case where plural pieces of video information of the same contents encoded using different coding methods cannot be recorded in duplicate for reasons of restrictions imposed by copyright management, a recording capacity or the like, it is possible to generate video information encoded using a given coding method from the video information encoded using another coding method at an extremely high speed to enable the use in another device.

For example, under the conditions that it is prohibited to record both the program contents in the MPEG-2 format and the program contents in the MPEG-4 format for reasons of restrictions imposed by copyright management or problems arising from a capacity of the recording unit, it is possible to generate the program contents in the MPEG-4 format from the program contents in the MPEG-2 format at an extremely high-speed to enable the use in another device.

It is preferable for the video information recording device described above to further include reception means for receiving the first encoded information, so that the recording means records therein the partial information generated by the generation means together with the first encoded information received at the reception means.

In this case, because the first encoded information is received and the generated partial information is recorded together with the received first encoded information, it is possible to generate the second encoded information with the use of the first encoded information and the partial information.

It is preferable that the generation means generates the partial information in parallel with at least one processing from reception processing of the first encoded information by the reception means and recording processing of the first encoded information by the recording means.

In this case, because the generation processing of the partial information is performed in parallel with at least on processing from the reception processing of the first encoded information and the recording processing of the first encoded information, the partial information can be generated within a time to record the first encoded information, which makes it possible to prevent an extra time from being wasted to generate the partial information.

It is preferable for the video information recording device described above to further include reception means for receiving video information containing the contents, and coding means for generating the first encoded information by encoding the video information received at the reception means using the first coding method, so that the recording means records therein the partial information generated by the generation means together with the first encoded information generated by the coding means.

In this case, because the video information containing the contents is received, the first encoded information is generated from the received video information and the partial information is recorded together with the first encoded information thus generated, it is possible to generate the second encoded information with the use of the first encoded information and the partial information.

It is preferable that the generation means generates the partial information in parallel with at least one processing from reception processing of the video information by the reception means, coding processing of the first encoded information by the coding means, and recording processing of the first encoded information by the recording means.

In this case, because the generation processing of the partial information is performed in parallel with at least one processing from the reception processing of the video information, the coding processing of the first encoded information, and the recording processing of the first encoded information, the partial information can be generated within a time to record the first encoded information, which makes it possible to prevent an extra time from being wasted to generate the partial information.

It is preferable for the video information recording device described above to further include reception means for receiving third encoded information encoded using a third coding method different from the first and second coding methods and containing the contents, and coding means for generating the first encoded information by encoding the third encoded information received at the reception means using the first coding method, so that the recording means records therein the partial information generated by the generation means together with the first encoded information generated by the coding means.

In this case, the third encoded information encoded using the third coding method and containing the contents is received, the first encoded information is generated from the received third encoded information, and the partial information is recorded together with the first encoded information thus generated. It is thus possible to generate the second encoded information with the use of the first encoded information and the partial information.

It is preferable that the generation means generates the partial information in parallel with at least one processing from reception processing of the third encoded information by the reception means, coding processing of the first encoded information by the coding means, and recording processing of the first encoded information by the recording means.

In this case, because the generation processing of the partial information is performed in parallel with at least one processing from the reception processing of the third encoded information, the coding processing of the first encoded information, and the recording processing of the first encoded information, the partial information can be generated within a time to record the first encoded information, which makes it possible to prevent an extra time from being wasted to generate the partial information.

It is preferable for the video information recording device described above to further include creation means for creating the second encoded information using the first encoded information and the partial information recorded in the recording means.

In this case, because the second encoded information is generated with the use of the first encoded information and the partial information, it is possible to generate the second encoded information at an extremely high speed with the use of the first encoded information and the partial information.

Another video information recording device of the invention includes recording means for recording therein first encoded information generated by encoding video information containing given contents using a first coding method and partial information used to generate second encoded information encoded using a second coding method different from the first coding method and containing the contents from the first encoded information, and generation means for generating the second encoded information using the first encoded information and the partial information recorded in the recording means.

According to the configuration described above, because the second encoded information can be generated with the use of the first encoded information and the partial information used to generate the second encoded information encoded using the second coding method different from the first coding method and containing the same contents from the first encoded information, even in a case where plural pieces of video information of the same contents encoded using different coding methods cannot be recorded in duplicate for reasons of restrictions imposed by copyright management, a recording capacity or the like, it is possible to generate video information encoded using a given coding method at an extremely high speed from video information encoded in another coding method to enable the use in another device.

It is preferable for the video information recording device described above to further include recording means for the second encoded information which records the second encoded information generated using the generation means, so that in a case where generation processing to generate the second encoded information is interrupted and the generation processing is resumed later, the generation means generates the second encoded information after interruption using the second encoded information that has been recorded in the recording means for the second encoded information.

In this case, because the second encoded information after interruption is generated with the use of the second encoded information that has been already recorded, there is no need to perform the time-taking processing again. Hence, even when generation is interrupted accidentally by a shut down of the power supply or the like, it is possible to significantly shorten the time needed to perform the generation processing again later.

It is preferable that the first coding method is a coding method that compresses the video information. In this case, because the first encoded information can be recorded in a small recording capacity, it is possible to generate the second encoded information with the use of recording means having a small recording capacity.

It is preferable that the first encoded information is one of encoded information in compliance with MPEG-2 standards and encoded information in compliance with MPEG-4 standards, and the second encoded information is encoded information in compliance with the other standards.

In this case, under the conditions that it is prohibited to record both the program contents in the MPEG-2 format and the program contents in the MPEG-4 format for reasons of restrictions imposed by copyright management, problems arising from a capacity of the recording unit or the like, it is possible to generate the program contents in the MPEG-4 format from the program contents in the MPEG-2 format or to generate the program contents in the MPEG-2 format from the program contents in the MPEG-4 format at an extremely high speed to enable the use in another device.

The first coding method may be a coding method that does not compress the video information. In this case, because the second encoded information can be generated with the use of uncompressed high-definition video information, it is possible to generate the high-definition second encoded information.

It is preferable that the partial information contains motion vector information. In this case, because it is not necessary to generate a motion vector from the first encoded information, there is no need to perform the motion vector computation that requires a processing time two orders of magnitude longer than the processing time of any other processing. It is thus possible to generate the second encoded information at an extremely high speed with the use of the first encoded information and the partial information.

It is preferable that the partial information contains DCT information. In this case, because it is not necessary to generate the DCT information from the first encoded information, there is no need to perform the generation processing of the DCT information. It is thus possible to generate the second encoded information at an extremely high speed with the use of the first encoded information and the partial information.

It is preferable that the partial information does not have at least one of a quantization table and a Huffman table. In this case, because it becomes difficult to restore the DCT information, it is possible to lower the risk involved with the issues of copyright.

It is preferable that the partial information contains shape coding information. In this case, because it is not necessary to generate the shape coding information from the first encoded information, there is no need perform the generation processing of the shape coding information. It is thus possible to generate the second encoded information at an extremely high speed with the use of the first encoded information and the partial information.

It is preferable that the partial information is information in an inter-frame compression frame of the video information containing the contents. In this case, because there is no need to perform the computation processing for an inter-frame compression frame, it is possible to generate the second encoded information at an extremely high speed with the use of the first encoded information and the partial information.

It is preferable that the partial information is information that takes a longer calculation time than other information used to generate the second encoded information from the first encoded information and the partial information alone is not able to play back an original video. In this case, it is possible to generate video information encoded using a given coding method at an extremely high speed from the video information encoded using another coding method without raising the issues of copyright.

It is preferable that at least one of the first and second encoded information is encoded information in compliance with H.264 standards.

In this case, even under the conditions that both the program contents in the H.264 format and the program contents in another format (because the coding method differs with the profile or the like in the H.264 format, it contains the program contents in the H.264 format of a different encoded format) for reasons of restrictions imposed by copyright management, problems arising from a capacity of the recording unit or the like, it is possible to generate the program contents in another format (including the program contents in the H.264 format of a different encoded format) from the program contents in the H.264 format or to generate the program contents in the H.264 format from the program contents in another format (including the program contents in the H.264 format of a different encoding format) at an extremely high speed to enable the use in another device.

It is preferable for the video information recording device described above to further include selection means for selecting information to be recorded as the partial information according to a recordable capacity of the recording means, so that the recording means records therein the information selected by the selection means as the partial information together with the first encoded information.

In this case, because the information to be recorded as the partial information is selected according to the recordable capacity of the recording means, it is possible to record the partial information that matches the recordable capacity.

It is preferable that the selection means selects motion vector information preferentially. In this case, because the motion vector information that affects the processing time most can be recorded preferentially, it is possible to generate the second encoded information at an extremely high speed with the use of the first encoded information and the motion vector information.

It is preferable that the selection means selects the information to be recorded as the partial information on the basis of a temporal position of the information. In this case, because the information to be recorded as the partial information is selected in reference not only to the recordable capacity of the recording means, but also to the temporal position of the information, it is possible to record the partial information by selecting the optimal partial information according to the recording capacity and the temporal position of the information.

It is preferable that the selection means selects the information to be recorded as the partial information on the basis of a spatial position of the information. In this case, because the information to be recorded as the partial information is selected in reference not only to the recordable capacity of the recording means, but also to the spatial position of the information, it is possible to record the partial information by selecting the optimal partial information according to the recordable capacity and the spatial position of the information.

It is preferable that the selection means selects the information to be recorded as the partial information on the basis of a color component of the information. In this case, because the information to be recorded as the partial information is selected in reference not only to the recordable capacity of the recording means, but also to the color component of the information, it is possible to record the partial information by selecting the optimal partial information according to the recordable capacity and the color component of the information.

It is preferable that the selection means selects the information to be recorded as the partial information on the basis of a calculation time of the information. In this case, because the information to be recorded as the partial information is selected in reference not only to the recordable capacity of the recording means, but also to the calculation time of the information, it is possible to record the partial information by selecting the optimal partial information according to the recordable capacity and the calculation time of the information.

It is preferable that the first coding method includes one of encryption processing and decryption processing. In this case, it is possible to record video information containing given contents as the first encoded information by encrypting or decrypting the video information.

INDUSTRIAL APPLICABILITY

According to the invention, even under the conditions that it is prohibited to record, for example, both the program contents in the MPEG-2 format and the program contents in the MPEG-4 format for reasons of restrictions imposed by copyright management, problems arising from a capacity of the recording unit or the like, it is possible to generate the program contents in the MPEG-4 format from the program contents in the MPEG-2 format at an extremely high speed to enable the use in another device. The industrial applicability of the invention is therefore quite high.

The invention claimed is:

1. A video information recording device comprising:
   an encoder including a processor for encoding, using a first coding method, a first video signal to produce first encoded data, the first video signal including a plurality of pictures, such that the first encoded data is produced by completely encoding the plurality of pictures of the first video signal using the first coding method;
   a generator for generating partial data from the same plurality of pictures of the first video signal by performing at least a partial encoding of the same plurality of pictures of the first video signal using a second coding method, the second coding method being different from the first coding method; and
   a recorder for recording, into a memory, (i) the first encoded data encoded by the encoder using the first coding method and (ii) the partial data generated by the generator using the second coding method,
   wherein, the recorder does not record into the memory a complete encoding, using the second coding method, of the same plurality of pictures of the first video signal.

2. The video information recording device according to claim 1, further comprising a receiver receiving an encoded video signal used to obtain the first video signal, which is a decoded portion of the encoded video signal.

3. The video information recording device according to claim 2, wherein the generator generates the partial data in parallel with at least one of (i) reception processing of the encoded video signal by the receiver and (ii) recording processing of the first encoded data by the recorder.

4. The video information recording device according to claim 2, wherein the generator generates the partial data in parallel with at least one of (i) reception processing of the encoded video signal by the receiver, (ii) coding processing of the first encoded data by the encoder, and (iii) recording processing of the first encoded data by the recorder.

5. The video information recording device according to claim 1, further comprising:
   a receiver receiving third encoded information encoded using a third coding method different from the first coding method and the second coding method and being used to obtain the first video signal, which is a decoded portion of the third encoded information, and
   wherein the encoder encodes, using the first coding method, the first video signal obtained from the third encoded information received by the receiver.

6. The video information recording device according to claim 5, wherein the generator generates the partial data in parallel with at least one of (i) reception processing of the third encoded information by the receiver, (ii) coding processing of the first video signal by the encoder, and (iii) recording processing of the first encoded data by the recorder.

7. The video information recording device according to claim 1, further comprising a creator creating second encoded data using the first encoded data and the partial data recorded in the memory by the recorder.

8. The video information recording device according to claim 1, wherein the first coding method is a coding method that compresses the first video signal.

9. The video information recording device according to claim 1, wherein the first encoded data is one of encoded data in compliance with MPEG-2 standards and encoded data in compliance with MPEG-4 standards, and the partial data is encoded data in compliance with standards other than the standards with which the first encoded data is in compliance.

10. The video information recording device according to claim 1, wherein the first coding method is a coding method that does not compress the first video signal.

11. The video information recording device according to claim 1, wherein the partial data contains motion vector information.

12. The video information recording device according to claim 1, wherein the partial data contains DCT information.

13. The video information recording device according to claim 12, wherein the partial data does not have at least one of a quantization table and a Huffman table.

14. The video information recording device according to claim 1, wherein the partial data contains shape coding information.

15. The video information recording device according to claim 1, wherein the partial data is information in an interframe compression frame of the first video signal.

16. The video information recording device according to claim 1, wherein the partial data is data that takes a longer calculation time than other data used to generate second encoded data from the first encoded data and the partial data alone is not able to reproduce an original video.

17. The video information recording device according to claim 1, wherein at least one of the first encoded data and the partial data is encoded data in compliance with H.264 standards.

18. The video information recording device according to claim 1, further comprising a selector selecting data to be recorded as the partial data according to a recordable capacity of the recorder,
   wherein the recorder records, into the memory, the data selected by the selector as the partial data along with the first encoded data.

19. The video information recording device according to claim 18, wherein the selector selects motion vector information preferentially.

20. The video information recording device according to claim 18, wherein the selector selects the data to be recorded as the partial data based on a temporal position of the data.

21. The video information recording device according to claim 18, wherein the selector selects the data to be recorded as the partial data based on a spatial position of the data.

22. The video information recording device according to claim 18, wherein the selector selects the data to be recorded as the partial data based on a color component of the data.

23. The video information recording device according to claim 18, wherein the selector selects the data to be recorded as the partial data based on a calculation time of the data.

24. The video information recording device according to claim 1, wherein the first coding method includes one of encryption processing and decryption processing.

25. A video information recording device comprising:
a recorder (i) including a memory, (ii) recording, into the memory, first encoded data generated by encoding, using a first coding method, a first video signal to produce the first encoded data, the first video signal including a plurality of pictures, such that the first encoded data is produced by completely encoding the plurality of pictures of the first video signal using the first coding method, (iii) recording, into the memory, partial data generated from the same plurality of pieces of the first video signal by performing at least a partial encoding of the same plurality of pictures of the first video signal using a second coding method that is different from the first coding method and (iv) not recording a complete encoding, using the second coding method, of the same plurality of pictures of the first video signal; and
a generator generating second encoded data using the first encoded data and the partial data recorded in the memory of the recorder.

26. The video information recording device according to claim 25,
wherein the video information recording device further includes a second recorder including a second memory,
wherein the second recorder records, into the second memory, the second encoded data generated by the generator, and
wherein, when generation processing of generating the second encoded data is first interrupted and then later resumed, the generator generates the second encoded data after the interruption using the second encoded data recorded in the second memory of the second recorder prior to the interruption.

27. A video information recording method comprising:
a step of recording, via a recorder of a recording apparatus, first encoded data generated by encoding, using a first coding method, a first video signal to produce the first encoded data, the first video signal including a plurality of pictures, such that the first encoded data is produced by completely encoding the plurality of pictures of the first video signal using the first coding method;
a step of generating, via a generator of the recording apparatus, partial data from the same plurality of pictures of the first video signal by performing at least a partial encoding of the same plurality of pictures of the first video signal using a second coding method, the second coding method being different from the first coding method; and
a step of recording, into the memory of the recorder, the generated partial data generated using the second coding method and not recording into the memory a complete encoding, using the second coding method, of the same plurality of pictures of the first video signal.

28. A non-transitory computer-readable recording medium having a video information recording program recorded thereon, the video information recording program causing a computer to function as:
a recorder recording, into a memory, first encoded data generated by encoding, using a first coding method, a first video signal to produce the first encoded data, the first video signal including a plurality of pictures, such that the first encoded data is produced by completely encoding the plurality of pictures of the first video signal using the first coding method; and
a generator generating partial data from the same plurality of pictures of the first video signal by performing at least a partial encoding of the same plurality of pictures of the first video signal using a second coding method, the second coding method being different from the first coding method,
wherein the recorder records, into the memory, the partial data generated by the generator and the first encoded data and does not record into the memory a complete encoding, using the second coding method, of the same plurality of pictures of the first video signal.

* * * * *